United States Patent
Wang et al.

(10) Patent No.: US 10,135,596 B2
(45) Date of Patent: Nov. 20, 2018

(54) NARROW BAND ACK / NACK TRANSMISSIONS

(71) Applicant: QUALCOMM Incorporated, San Diego, CA (US)

(72) Inventors: Renqiu Wang, San Diego, CA (US); Hao Xu, San Diego, CA (US); Wanshi Chen, San Diego, CA (US); Peter Gaal, San Diego, CA (US); Xiao Feng Wang, San Diego, CA (US); Alberto Rico Alvarino, San Diego, CA (US); Seyed Ali Akbar Fakoorian, San Diego, CA (US); Jing Lei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 29 days.

(21) Appl. No.: 15/272,246

(22) Filed: Sep. 21, 2016

(65) Prior Publication Data
US 2017/0207894 A1 Jul. 20, 2017

Related U.S. Application Data

(60) Provisional application No. 62/313,071, filed on Mar. 24, 2016, provisional application No. 62/281,099, filed on Jan. 20, 2016.

(51) Int. Cl.
*H04L 5/00* (2006.01)
*H04L 1/16* (2006.01)
(Continued)

(52) U.S. Cl.
CPC .......... *H04L 5/0055* (2013.01); *H04L 1/1664* (2013.01); *H04L 1/1685* (2013.01);
(Continued)

(58) Field of Classification Search
None
See application file for complete search history.

(56) References Cited

U.S. PATENT DOCUMENTS 7,403,470 B2 * 7/2008 Lane .................. G06Q 50/22
370/203
7,782,766 B2 * 8/2010 Ohkuma .................. H04Q 9/00
370/229
(Continued)

FOREIGN PATENT DOCUMENTS

EP 2077677 A1 7/2009
EP 2197132 A1 6/2010
(Continued)

OTHER PUBLICATIONS

International Search Report and Written Opinion—PCT/US2016/062895—ISA/EPO—dated Apr. 10, 2017.

*Primary Examiner* — Hong S Cho
(74) *Attorney, Agent, or Firm* — Arent Fox, LLP

(57) ABSTRACT

The present disclosure provides various modifications to existing techniques for transmitting ACK and/or NACK in an narrow band communications system. For example, in a first aspect, an apparatus receives a downlink transmission and transmits a single tone ACK on an ACK channel using time-spreading. In another aspect, an apparatus determines whether an ACK has been received from a UE within a threshold amount of time, and when an ACK has not been received from the UE for at least the threshold amount of time, transmitting an indication to the UE to transmit regarding the ACK.

69 Claims, 15 Drawing Sheets

(51) Int. Cl.
*H04L 13/16* (2006.01)
*H04J 13/16* (2011.01)

(52) U.S. Cl.
CPC ............ *H04L 1/1692* (2013.01); *H04J 13/16* (2013.01); *H04J 2013/165* (2013.01)

(56) References Cited

U.S. PATENT DOCUMENTS

| | | | | |
|---|---|---|---|---|
| 9,369,999 | B2* | 6/2016 | Seo | H04L 5/0032 |
| 2003/0002449 | A1* | 1/2003 | Rittle | H04L 1/1671 |
| | | | | 370/277 |
| 2009/0046646 | A1* | 2/2009 | Cho | H04L 1/1607 |
| | | | | 370/329 |
| 2010/0091756 | A1* | 4/2010 | Hogenmueller | H04L 1/1692 |
| | | | | 370/345 |
| 2012/0014320 | A1* | 1/2012 | Nam | H04L 1/1671 |
| | | | | 370/328 |
| 2012/0057449 | A1* | 3/2012 | Takaoka | H04B 1/713 |
| | | | | 370/210 |
| 2012/0106327 | A1* | 5/2012 | Lin | H04L 12/66 |
| | | | | 370/230 |
| 2013/0070580 | A1* | 3/2013 | Wang | H04J 13/004 |
| | | | | 370/209 |
| 2013/0279459 | A1* | 10/2013 | Lee | H04L 1/0029 |
| | | | | 370/329 |
| 2014/0064237 | A1* | 3/2014 | Lee | H04L 5/0055 |
| | | | | 370/329 |
| 2014/0092856 | A1 | 4/2014 | Yang et al. | |
| 2015/0036639 | A1* | 2/2015 | Kwak | H04L 1/1854 |
| | | | | 370/329 |
| 2016/0218836 | A1* | 7/2016 | Yamamoto | H04L 1/1671 |
| 2016/0380740 | A1* | 12/2016 | Yum | H04L 5/0055 |
| | | | | 370/329 |
| 2017/0141833 | A1* | 5/2017 | Kim | H04B 7/0626 |

FOREIGN PATENT DOCUMENTS

| | | |
|---|---|---|
| EP | 2552044 A2 | 1/2013 |
| WO | 0122645 A1 | 3/2001 |
| WO | 2009045044 A1 | 4/2009 |
| WO | 2011041623 A1 | 4/2011 |
| WO | 2012171867 A1 | 12/2012 |

* cited by examiner

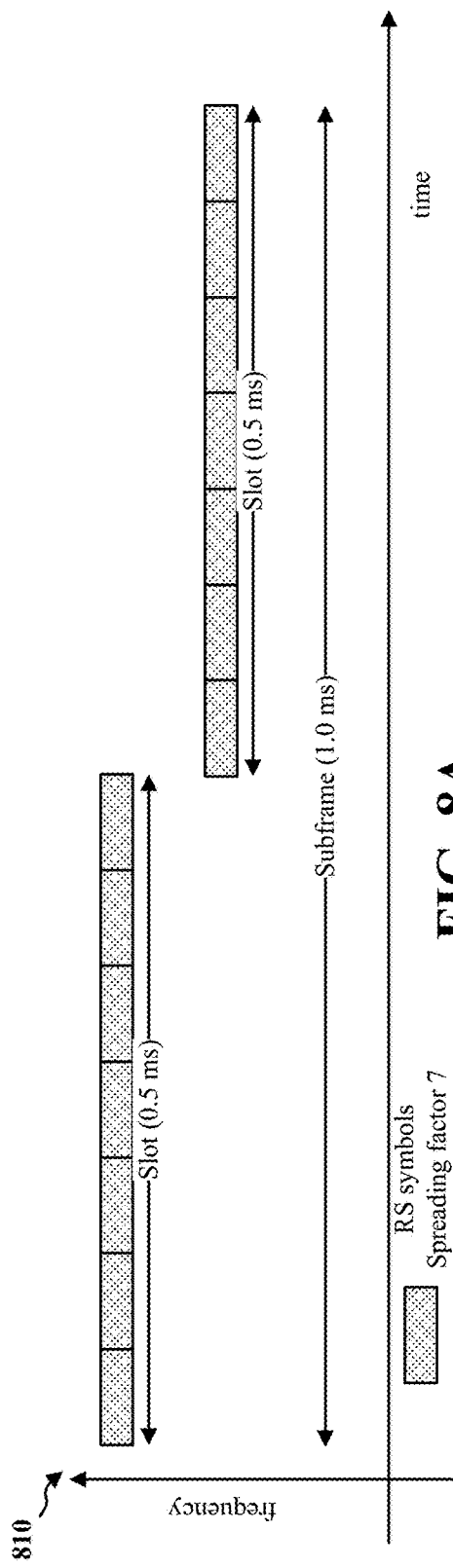
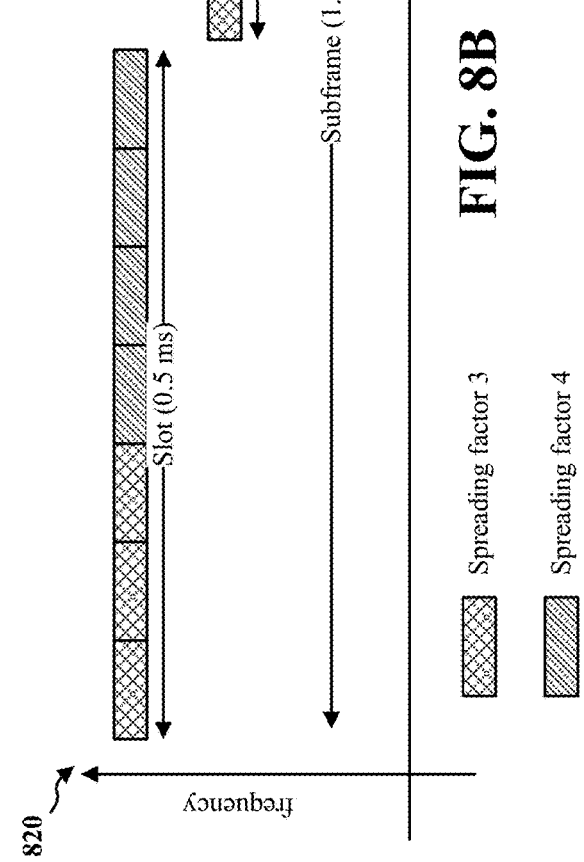
FIG. 8A
FIG. 8B

NARROW BAND ACK / NACK TRANSMISSIONS

CROSS-REFERENCE TO RELATED APPLICATIONS

This application claims the benefit of U.S. Provisional Application Ser. No. 62/281,099, entitled "NARROW BAND ACK/NACK TRANSMISSIONS" and filed on Jan. 20, 2016, and U.S. Provisional Application Ser. No. 62/313, 071, entitled "NARROW BAND ACK/NACK TRANSMISSIONS" and filed on Mar. 24, 2016, both of which are expressly incorporated by reference herein in its entirety.

BACKGROUND

Field

The present disclosure relates generally to communication systems, and more particularly, to a narrow band internet-of-things (NB-IOT) acknowledgement (ACK)/negative acknowledgement (NACK) transmission techniques.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

For example, in narrow band internet-of-things (NB-IOT), wireless communications are limited to a single tone bandwidth. Therefore, if an ACK and/or NACK is required in response to a received downlink transmission, the ACK and/or NACK may take up too many resources in the limited single tone bandwidth dimension of NB-IOT.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In NB-IOT, wireless communications may be limited to a single RB bandwidth. Therefore, if an ACK/NACK is communicated in response to a received downlink transmission, the ACK and/or NACK may take up too many resources in the limited single RB bandwidth of NB-IOT. Due to the bandwidth limitations, using existing techniques for transmitting an ACK and/or NACK may be undesirable.

Therefore, the present disclosure provides various modifications to existing techniques for transmitting ACK and/or NACK in an NB-IOT communications system. For example, in a first aspect, the present disclosure provides a technique that includes a single tone transmission of the ACK/NACK on an ACK channel using time-spreading. In a second aspect, the present disclosure provides a technique that refrains, at least temporarily, from transmitting an ACK. This aspect may include transmitting the NACK without an ACK when no additional data is present for transmission, and transmitting the ACK/NACK on the physical uplink shared channel (PUSCH) when there is additional data for transmission. In a third aspect, the present disclosure provides a technique that includes transmitting a group of ACKS on the PUSCH, or relying on upper layers for ACK transmissions.

In an aspect of the disclosure, a method, a computer-readable medium, and an apparatus for wireless communication are provided. The apparatus receives a downlink transmission and transmits a single tone ACK on an ACK channel using time-spreading. The transmission may include three demodulation reference signal (DM-RS) symbols per a seven symbol period. The transmission may include a spreading factor of three for the DM-RS symbols. The transmission may include a spreading factor of two or four for data symbols.

In an aspect, the apparatus may refrain from transmitting at least one ACK associated with the downlink transmission until an indication to transmit an ACK is received. The apparatus may receive an indication to transmit ACKS from an evolved node B (eNB) and may then transmit regarding ACKS to the eNB. The indication to transmit ACKs may indicate a period for which the UE shall indicate whether wireless communications were successfully received from the eNB.

In another aspect of the disclosure, a method, a computer-readable medium, and an apparatus for wireless communication are provided. The apparatus determines whether an ACK has been received from a user equipment (UE) within a threshold amount of time, and when an ACK has not been received from the UE for at least the threshold amount of time, the apparatus transmits an indication to the UE to transmit regarding the ACK. The apparatus may perform blind detection of at least one of a NACK and a scheduling request (SR) transmitted simultaneously with the NACK or ACK.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 8A and 8B are diagrams illustrating a single tone NACK transmission 810, 820 without an ACK with slot based frequency hopping.

DETAILED DESCRIPTION

Figure 1:
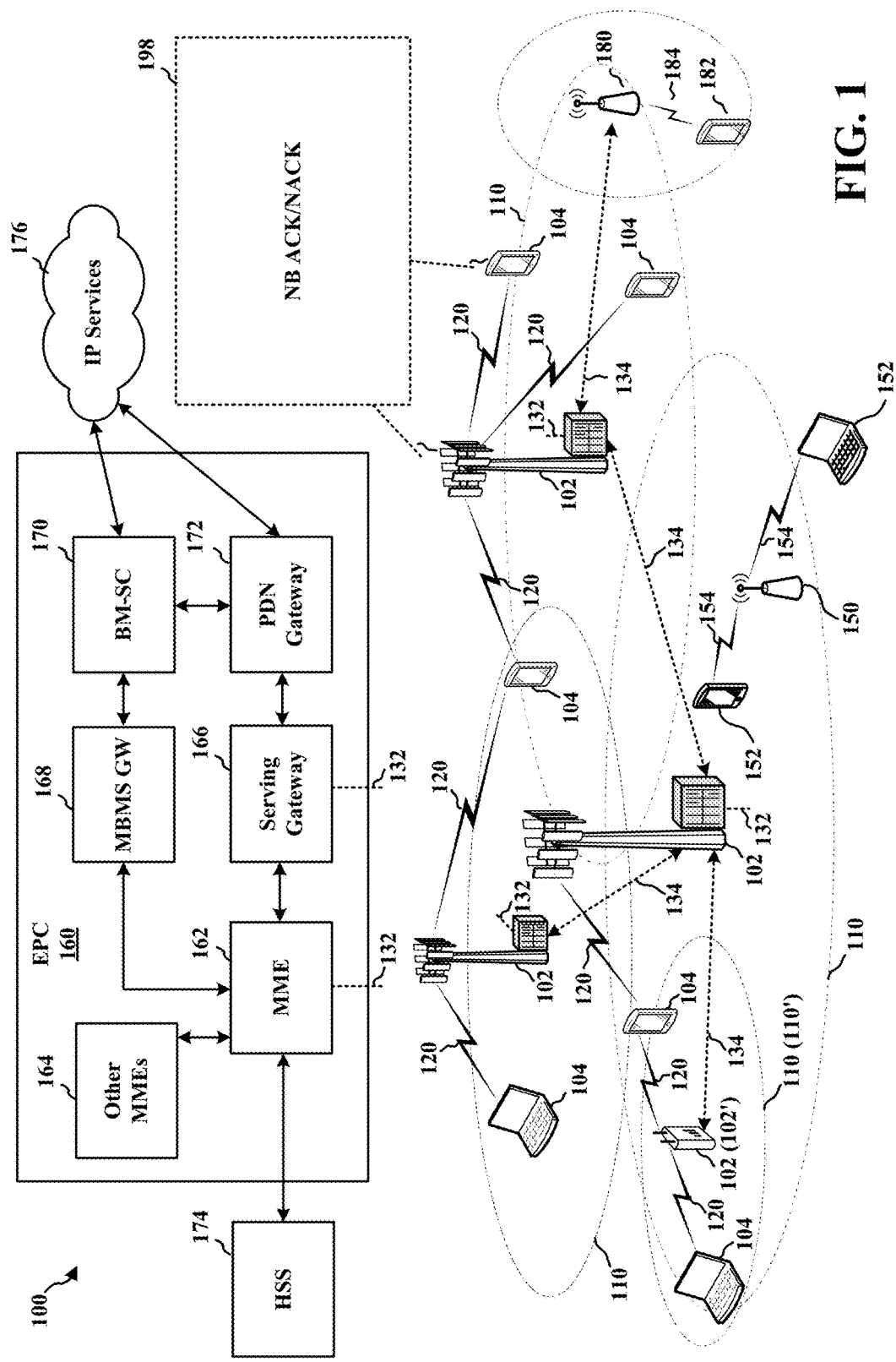
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The millimeter wave (mmW) base station 180 may operate in mmW frequencies and/or near mmW frequencies. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range.

The mmW base station 180 may utilize beamforming 184 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to transmit an NB ACK/NACK communication (198) to the eNB 102, e.g., using a single tone. For example, in a first aspect, the UE 104 perform a single tone transmission of the ACK/NACK, e.g., on an ACK channel. In a second aspect, the UE 104 may transmit the NACK without a ACK when no additional data is present for transmission, and transmit the ACK/NACK on the PUSCH when there is additional data for transmission. In a third aspect, the UE 104 may transmit a group of ACKs on the PUSCH, or relying on upper layers for ACK transmissions. The UE may additionally determine, at times, to refrain from transmitting at least one ACK transmission.

Figure 2:
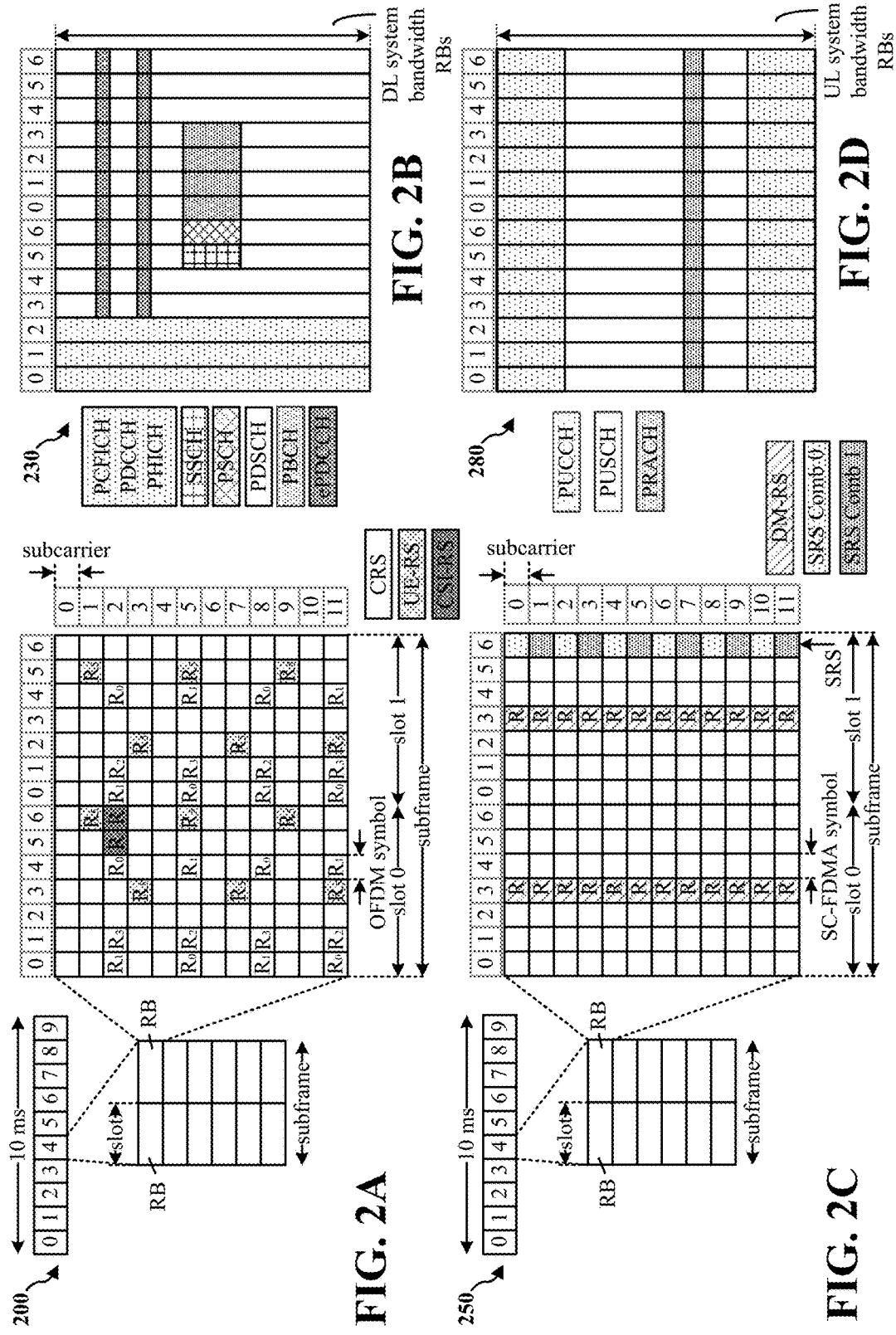
FIGS. 2A, 2B, 2C, and 2D are diagrams illustrating LTE examples of a DL frame structure, DL channels within the DL frame structure, an UL frame structure, and UL channels within the UL frame structure, respectively.

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
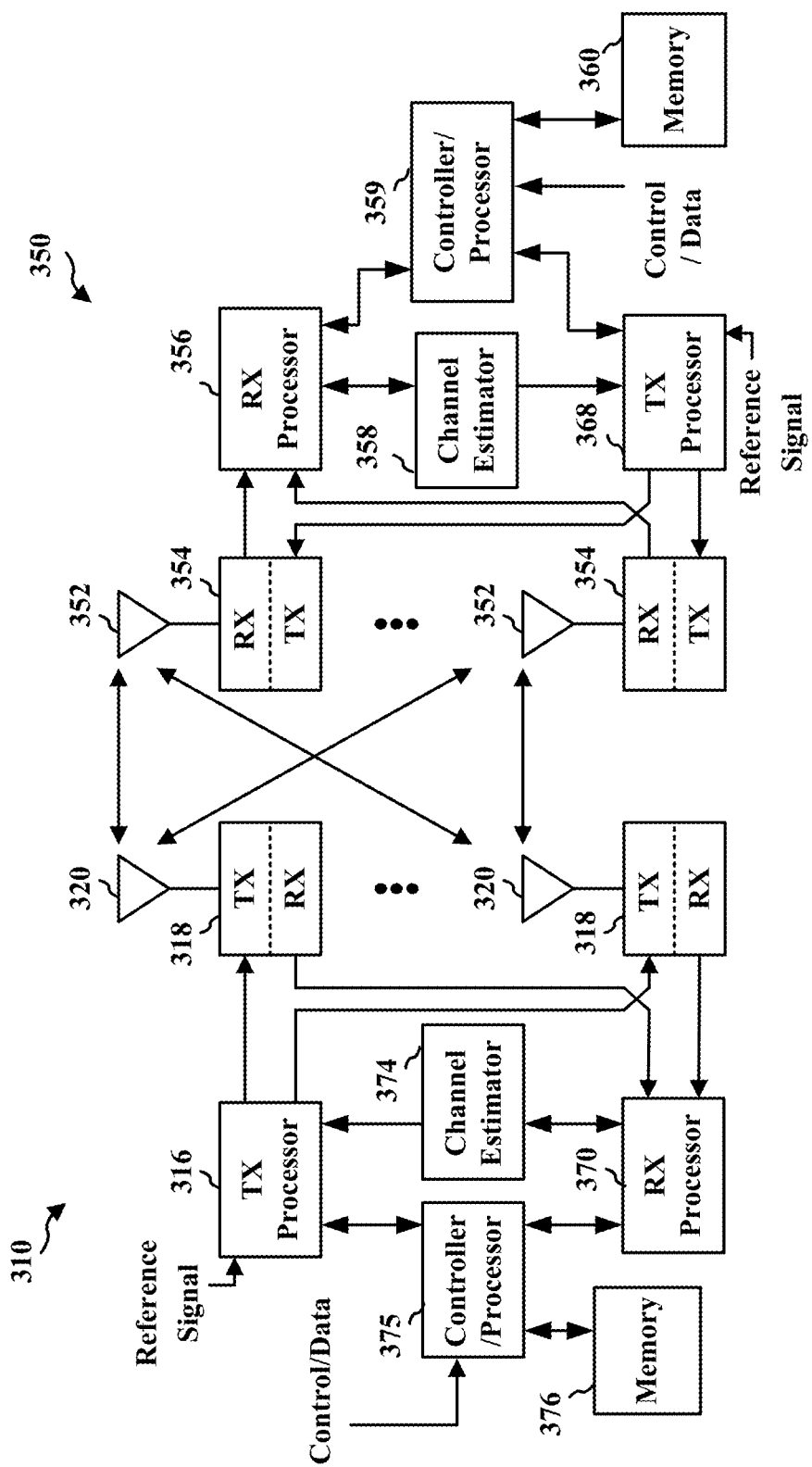
FIG. 3 is a diagram illustrating an example of an evolved Node B (eNB) and user equipment (UE) in an access network.

FIG. 3 is a block diagram of an eNB 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
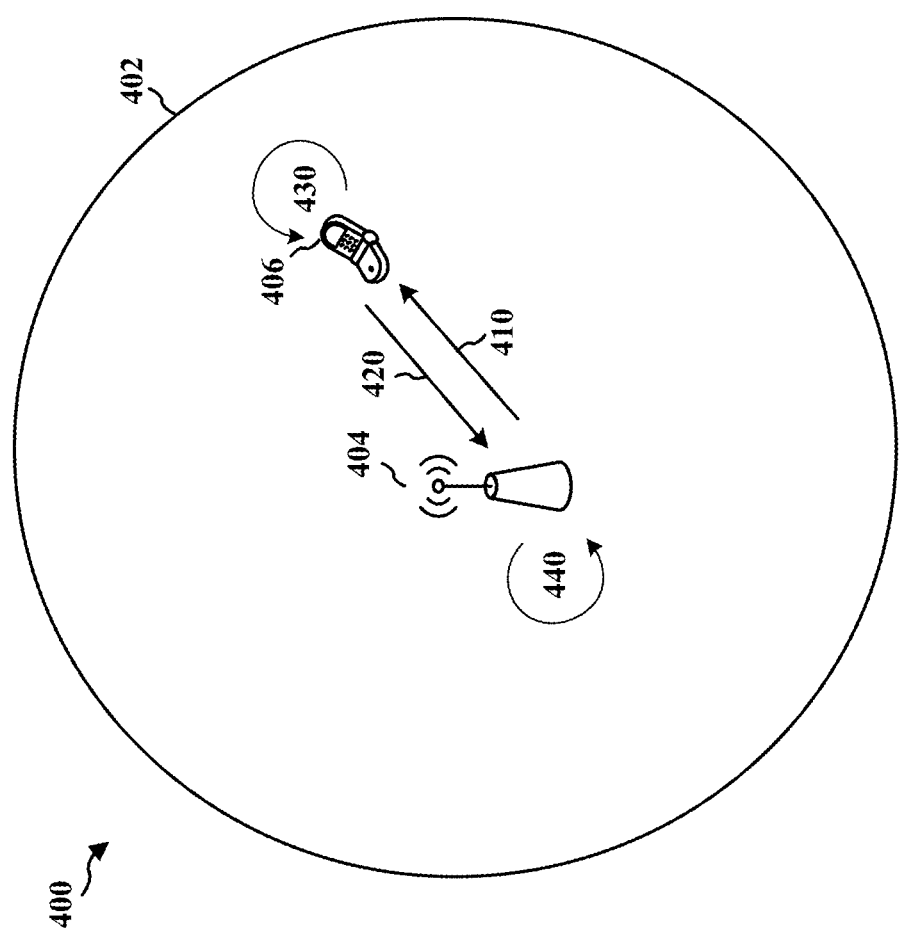
FIG. 4 is a diagram of a NB communications system.

FIG. 4 is a diagram of a Narrow Band (NB) communications system 400, such as an NB-IOT communication system. The NB communications system 400 may include an eNB 404 in communication with a UE 406 located in cellular region 402. For example, the eNB 404 may transmit a NB downlink transmission 410 to UE 406 using limited bandwidth such as a single tone. In response to the NB downlink transmission 410, the UE 406 may transmit an NB uplink transmission 420 that includes an ACK and/or NACK. For example, the one or more of downlink transmission 410 and/or the ACK and/or NACK 420 may be an NB wireless communication, e.g., using a single tone.

NB wireless communication involves unique challenges due to the limited frequency dimension of the narrow band. For example, NB IOT may be limited to a single resource block of system bandwidth, e.g., 200 Hz. This narrow band communication may be deployed "in-band," utilizing resource blocks within a normal LTE carrier, or in the unused resource blocks within a LTE carrier's guard-band, or "standalone" for deployments in dedicated spectrum. Multiple users, e.g., UEs may utilize the narrow band. While only some of the UEs may be active at a particular time, the NB communication should support such multi-user capacity.

Additionally, NB may need to provide for deep coverage, by accounting for devices in environments requiring different Coverage Enhancement (CE) levels. For example, some device may need as much as 20 dB of CE, which results in greater uplink TTI bundling, further limiting time resources.

NB-IOT communication may also involve a large cell radius, e.g., as much as approximately 35 km. Thus, the communication may involve a long delay, such as 200 µs, which may involve a long Cyclic Prefix (CP) length.

In order to be effective, the NB communication should provide a false alarm rate below 1% and a miss detection rate below approximately 1%. A transmitter may need to estimate a timing offset estimate between the transmitter and the corresponding receiver. It may be preferable for such a timing offset to be within a Normal Cyclic Prefix (NCP), e.g., <approximately 4.7 µs.

Wideband communication may include frequency code division multiplexing (CDM) with cyclic shifts. Such communication may include timing domain CDM with orthogonal cover codes.

In contrast, in NB communication, the UE is communicating using limited bandwidth, such as a single RB, which leads to unique challenges in transmitting an ACK/NACK using the limited resources.

In one aspect, the ACK and/or the NACK 420 may be transmitted on an ACK channel using a single tone transmission with time-spreading. Although the channel is described as an ACK channel, in certain aspects, NACK may also be transmitted using the ACK channel.

Figure 5:
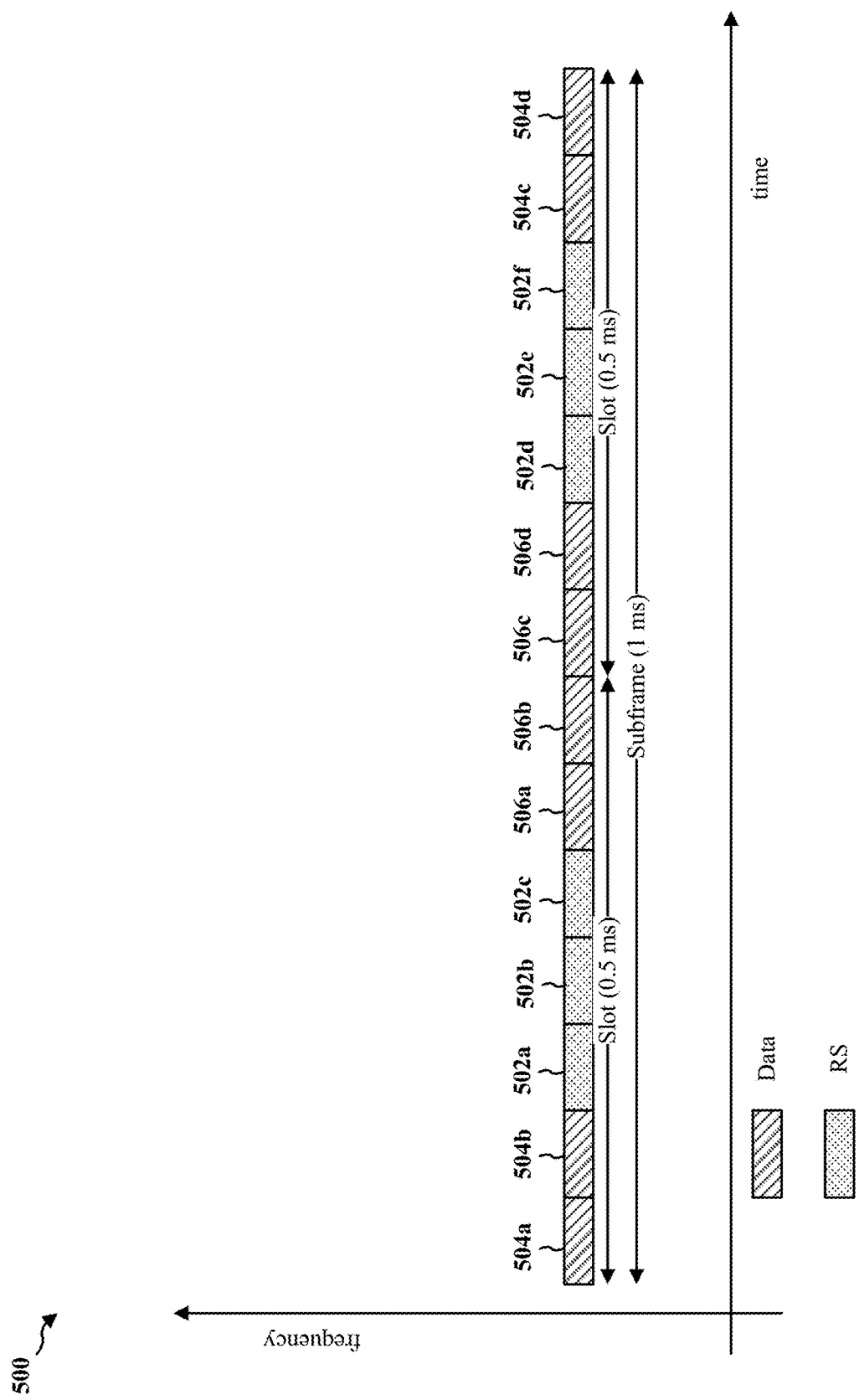
FIG. 5 is a diagram illustrating a single tone ACK and/or NACK transmission 500 using an ACK channel without slot based frequency hopping.

FIG. 5 is a diagram illustrating a single tone ACK and/or NACK transmission 500 using an ACK channel without slot based frequency hopping. Each slot illustrated in FIG. 5 may include seven symbols with three RS symbols (e.g., DM-RS symbols) in the middle of each slot, and two data symbols located on either end of the three RS symbols. This may be the same or similar to ACK format 1 used in LTE communications. It should be understood that DM-RS symbols may be used interchangeably with any mention of RS symbols discussed supra in the present disclosure.

The example illustrated in FIG. 5 includes a single tone ACK and/or NACK transmission in which each of the symbols occupy a single tone. Multiple users may be code division multiplexed cross multiple symbols with different orthogonal cover codes for better user capacity. For example, the RS symbols in each slot may use a Discrete Fourier Transform (DFT) spreading code, while each data symbol in each slot may use a different spreading code. Cover hopping (e.g., using different spreading codes) may be used across different subframes (only one subframe is depicted in FIG. 5) to suppress interference. For example, the spreading may be performed using an orthogonal cover code. The orthogonal cover code may be pseudo-randomly selected according to $n_{cs}^{cell}(n_s, 1) \mod 3$. Here, $n_{cs}^{cell}(n_s, 1)$ is the cell specific cyclic shift and mod 3 is the number of possible spreading codes that may be used for RS spreading.

FIG. 5 illustrates a single tone transmission in which each of the two slots is transmitted using the same tone index. In other words, there may be no slot based frequency hopping. Since there is no slot based frequency hopping, more user multiplexing may occur since there is a spreading factor of three or six per subframe across two slots. For example, the transmission 500 may include a spreading factor of three for DM-RS symbols and a spreading factor of either two or four for data symbols. In addition, further spreading may be used across multiple subframes, e.g., subframe to subframe. Thus, in the transmission 500, three DM-RS symbols may be included per seven symbol period. The transmission illustrates a spreading factor of three for the DM-RS symbols 502*a-g*. The transmission includes a spreading factor of two for data symbols on the edge of the subframe 504*a*, 504*b* and 504*c*, 504*d* and a spreading factor of four for data symbols 506*a-d* in the middle of the subframe between the DM-RS symbols. A first subframe having two data symbols at the end edge, e.g., 504*c*, 504*d* may be positioned adjacent to two data frames at the beginning edge of the next consecutive subframe. Thus, this pattern would lead to four data symbols between each set of three DM-RS symbols.

Frequency hopping may be used between different subframes, however, a single frequency may be used within a subframe. As there is no slot based frequency hopping in the example illustrated in FIG. 5, timing offset estimation may not be performed when there is phase discontinuity across subframes. For example, this may cause timing drift between the UE 406 and the eNB 404. To correct the timing drift, the eNB 404 may measure the timing difference 440 and issue a timing adjustment 410 to the UE 406.

Figure 6:
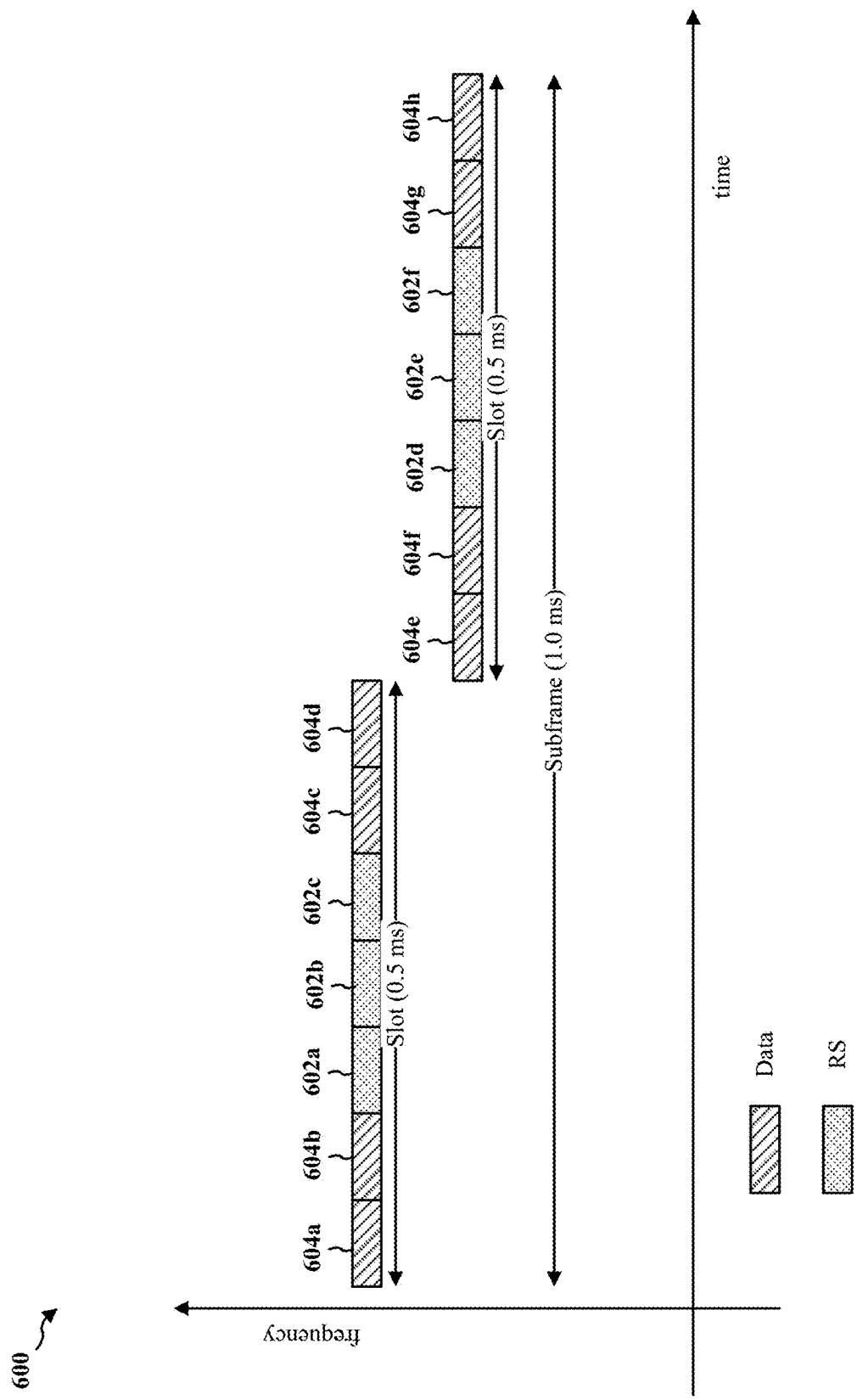
FIG. 6 is a diagram illustrating a single tone ACK and/or NACK transmission 600 using an ACK channel with slot based frequency hopping in the same RB.

FIG. 6 is a diagram illustrating a single tone ACK and/or NACK transmission 600 using an ACK channel with slot based frequency hopping in the same RB. Each slot illustrated in FIG. 6 may include seven symbols with three RS symbols located in the middle of each slot, and two data symbols located on either end of the three RS symbols. For example, the first slot includes RS symbols 602*a-c*, and the second slot includes RS symbols 602*e-g*. The first slot includes data symbols 604*a*, 604*b*, 604*c*, and 604*d*, and the second slot includes data symbols 604*e*, 604*f*, 604*g*, and 604*h*. This may be the same or similar to ACK format 1 in LTE communications.

In the example illustrated in FIG. 6, each of the symbols occupies a single tone, and each of the two slots in the subframe is transmitted using a different tone index. By transmitting each of the two slots using a different tone index, an increase in frequency diversity may be achieved by averaging the interference of the two slots. In addition, the eNB 404 may determine 440 a timing offset estimation by estimating a phase offset between the two tones indices of the two slots. However, by transmitting each of the two slots using a different tone index, user multiplexing capability may be decreased.

For example, if a spreading factor of three is used in the example illustrated in FIG. 6, after dispreading (e.g., by the eNB 404) there will only be one RS per slot after despreading. Consequently, the eNB 404 may not be able to estimate and compensate for potential frequency errors. Alternatively, if a spreading factor of one is used in the example illustrated in FIG. 6, the eNB 404 may have to rely on cross subframe spreading for user multiplexing. In addition, if a spreading factor of one is used, the eNB 406 may be able to perform time tracking with multiple RS symbols per slot to compensate for any frequency errors.

Figure 7A:
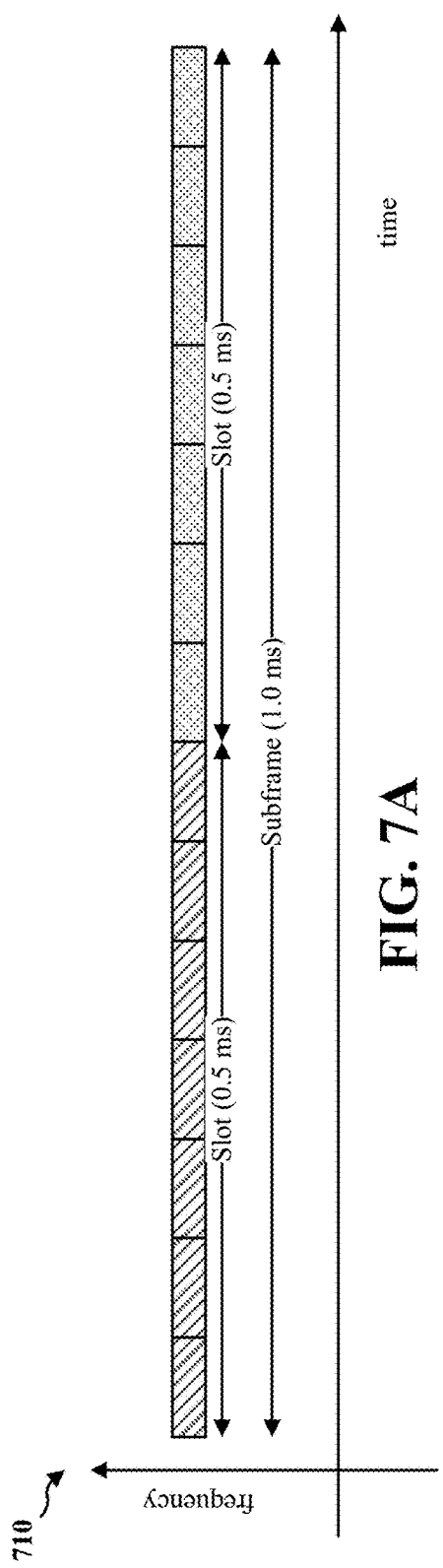
FIGS. 7A and 7B are diagrams illustrating a single tone ACK and/or NACK transmission 710, 720 without using slot based frequency hopping.
Figure 7B:
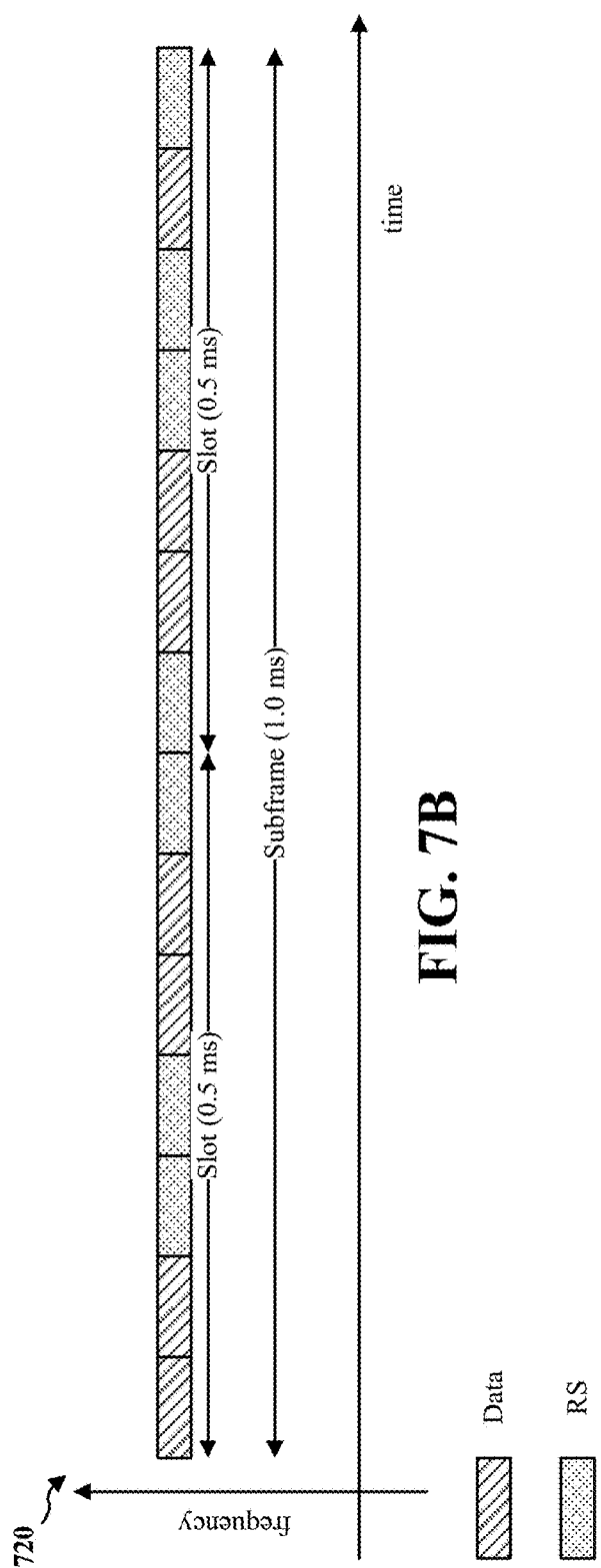

Referring again to FIG. 4, the ACK and/or the NACK 420 may be transmitted on an ACK channel using a single tone transmission without slot based frequency hopping using a modified structure, e.g., as discussed infra with respect to FIGS. 7A and 7B.

FIGS. 7A and 7B are diagrams illustrating a single tone ACK and/or NACK transmission 710, 720 using an ACK channel without using slot based frequency hopping. For example, each slot illustrated in FIGS. 7A and 7B may include seven symbols, and the subframe may include seven RS symbols and seven data symbols.

In the example illustrated in FIG. 7A, one slot may include all seven of the RS symbols for the subframe, and the other slot may include all seven of the data symbols for the subframe. Since there is an equal number of RS symbols and data symbols (e.g., the RS symbols and the data symbols are balanced) per subframe, error performance may be improved. In addition, the user multiplexing capacity can be improved from six (e.g., see FIG. 5) to seven. The placement of the RS symbols and the data symbols may be consecutive, as illustrated in FIG. 7A. However, the placement need not be consecutive, and the placement of the RS symbols relative to the data symbols may be arbitrary.

In one such example, as illustrated in FIG. 7B, the RS symbols and the data symbols may be interlaced within the subframe. For example, one slot may include four data symbols and three RS symbols, while the other slot may include three data symbols and four RS symbols. The RS pattern may be selected to increase channel estimation accuracy by the eNB 404.

Referring again to FIG. 4, at times the UE 406 may have user data and ACK and/or NACK to transmit to the eNB 404. In one aspect, the ACK and/or NACK transmission 420 may be transmitted with the user data on a first channel, e.g., PUSCH rather than the ACK channel. When there is no user data to be transmitted to the eNB 404, the UE 406 may transmit a NACK 420 without an ACK on a second channel, e.g., on the ACK channel, using a single tone transmission with slot based frequency hopping, as discussed infra with respect to FIGS. 8A and 8B.

FIGS. 8A and 8B are diagrams illustrating a single tone NACK transmission 810, 820 without an ACK with slot based frequency hopping. In one aspect, the NACK may be transmitted using an on/off configuration. In addition, the on/off configuration may be based on sequence (cover) without pilot that provides energy detection. For example, when a NACK is transmitted without an ACK, there may be no need to differentiate between a data symbol and an RS symbol (e.g., as in FIGS. 5, 6, 7A, and 7B) since all symbols in the two slots are known (e.g., a fixed value of "1"). Thus, all symbols in each slot may be a known sequence with different users using different sequences.

In the example illustrated in FIG. 8A, each slot may include seven symbols, and the subframe may include fourteen RS symbols and no data symbols. Thus, each slot contains seven RS symbols and no data symbols. In other words, there is a spreading factor of seven per subframe with respect to the RS symbols. By using slot based frequency hopping in the example illustrated in FIG. 8A, time tracking may be performed by the eNB 404. In addition, RS symbols from seven users may be multiplexed, and the eNB 404 may perform time tracking with one symbol per slot after spreading. Alternatively, the NACK transmission 810 may include no slot based frequency hopping (not illustrated in FIGS. 8A and 8B). In which case, fourteen users may be multiplexed.

In the example illustrated in FIG. 8B, each slot may include seven symbols with the first three symbols of each slot with spreading factor 3, and the last four symbols of each slot with spreading factor of 4. The eNB 404 may perform time tracking with two symbols per slot after spreading, which may also enable frequency error correction.

Thus, the UE may refrain from transmitting at least one ACK. The UE may refrain from transmitting ACKs until it receives an indication from an eNB to transmit the ACKs. Referring again to FIG. 4, if the eNB 404 has not received an ACK and/or NACK 420 from the UE 406 in a predetermined period of time, the eNB 404 may assume that all HARQ feedback related to the downlink transmission 410 may be ACKs or that the UE 404 has not received an uplink grant indicating the resources available for sending the ACK and/or NACK. In the latter case, the eNB 404 may transmit a new grant 410 for UE 406 to transmit the ACKs 420 in PUSCH. In one aspect, the grant may indicate at which point in time the eNB 404 last received an ACK and/or NACK so that the UE 406 may determine which ACKs to transmit.

Still referring to FIG. 4, the UE 406 may send a scheduling request (SR) 420 to the eNB 404 when the UE 404 has user data to transmit along with the ACK and/or NACK 420 in response to the downlink transmission 410. In this scenario, transmissions from the UE 406 may include 2 possibilities: NACK only or SR+NACK or ACK. The UE 406 may use different resources for transmitting each of the two different possibilities and eNB 404 may perform blind detection to determine the information included in the transmission from the UE 406.

In a first example, the same ACK channel structure may be used for both of the possibilities discussed supra, and therefore three different resources may be used for transmitting NACK only, SR+NACK or SR+ACK. For example, the different resources used to transmit the three different possibilities may include either different tones or different sequences/cover codes.

In a second example, a different ACK channel structure may be used for the two possibilities discussed supra, and single tone may be used for transmitting NACK only or SR+NACK/ACK. In one aspect, the single tone for NACK only may include a sequence based structure with or without frequency based hopping, as illustrated in FIGS. 5 and 6. In another aspect, the single tone for SR+NACK or SR+ACK may include a modified channel structure with pilot signals with or without frequency based hopping, as illustrated in FIGS. 7A and 7B.

In a third example, a unified structure may be used for transmitting the two possibilities discussed supra, and single tone may be used for transmitting each of the NACK only and SR+NACK/ACK. In one aspect, the single tone for NACK only and SR+NACK/ACK may include a spreading factor of 3 and 4, as discussed supra with respect to FIG. 8B.

Referring again to FIG. 4, up to 90% of the downlink transmissions 410 may be correctly received and/or decoded by the UE 406. Thus, the UE 406 may skip transmitting an ACK to the eNB 404 in response to downlink transmission(s) 410. Alternatively, the ACK may be transmitted on the PUSCH. However, the ACK may include a few bits (e.g., one or two bits), and the PUSCH is not optimized to transmit a few bits of information. Instead, the PUSCH may be optimized to transmit at least sixteen bits of information.

Therefore, when the UE 406 has one or more ACKS but no data to transmit, the UE 406 may group 430 (e.g., buffer) multiple ACKS together until the UE 406 determines 430 that either data also needs to be transmitted or there is at least a predetermined number of bits in the grouped ACKs (e.g. sixteen bits). Alternatively, the UE 406 may refrain from performing a transmission of an ACK to the eNB 404, and instead rely on upper layers for the ACK.

In one aspect, the UE 406 may multiplex the ACK channel with the PUSCH. In a first option, both the ACK channel and the PUSCH may frequency hop within a subframe. In a second option, both the ACK channel and PUSCH may be continuous and include no frequency hopping within a subframe. In a third option, the ACK channel may frequency hop between edge tones of the RB, and the PUSCH may occupy the middle remaining tones of the RB.

The eNB 404 may need to adjust 440 a timing adjustment timer according to a bundle size of the NB uplink communication 420. For example, for wideband communication, a maximum timer for timing adjustment (TA) may be approximately 10 s. However, for NB communication, the bundle size may be small and may correspond to a few seconds. Therefore, the time for TA may be increased for such NB communication. For example, the TA timer may be increased based on a bundle size for the communication, i.e., TA command is issued at least after the bundle of transmission is finished.

Figure 9:
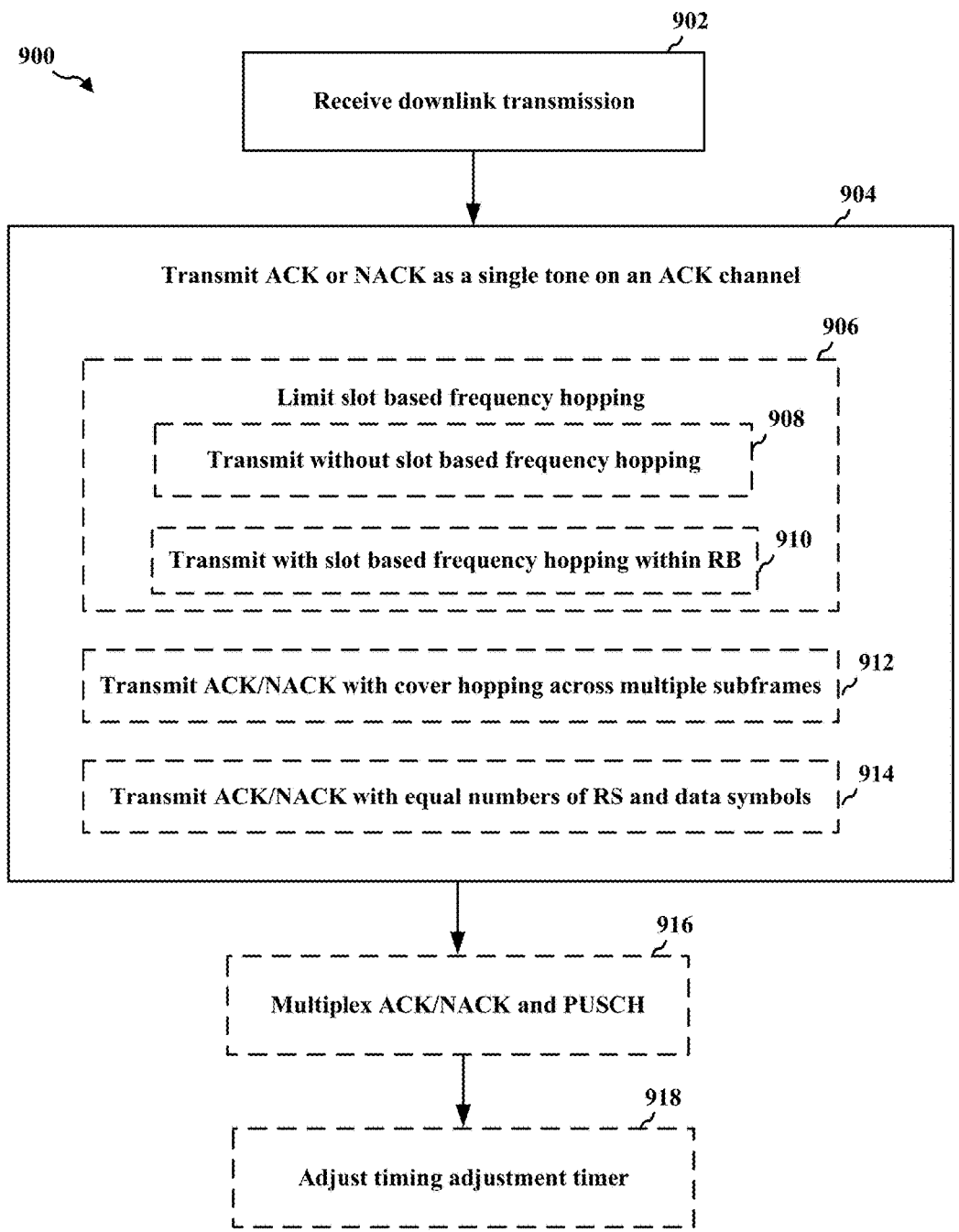
FIG. 9 is a flowchart of a method of wireless communication.

FIG. 9 is a flowchart 900 of a method of wireless communication. The method may be performed by a UE (e.g., the UE 104, 350, 406, 1450, the apparatus 1102/1102'). Optional aspects in the figures are illustrated using a dashed line.

At 902, the UE receives a downlink transmission, e.g., from an eNB, such as eNB 102, 310, 404, 1150, apparatus 1402/1402'. The wireless communication between the UE and the eNB may comprise narrow band wireless communication.

At 904, the UE transmits one of an ACK or a NACK on an ACK channel in response to receiving the downlink transmission. The ACK or NACK transmission may be single tone transmission transmitted on the ACK channel using time-spreading.

The ACK/NACK transmission may include three demodulation reference signal (DM-RS) symbols per a seven symbol period, an example of which is illustrated in FIGS. 5 and 6. The transmission may include a spreading factor of three for the DM-RS symbols, as illustrated for RS 502a-f in FIG. 5 and for RS 602a-f in FIG. 6. The transmission may include a spreading factor of two, e.g., as illustrated for data symbols 504a-d, or four for data symbols, e.g., as illustrated for data symbols 506a-d.

Multiple users may be code division multiplexed with different orthogonal cover codes that cross multiple symbols in a time domain, e.g., as described in connection with FIG. 5. At 912, the transmission of the ACK or NACK may be transmitted using cover hopping across multiple subframes. An orthogonal cover code may be selected to perform the spreading of the RS and data symbols, and wherein the orthogonal cover code may be a function of a cell specific cyclic shift and a number of spreading factors. Thus, other structures or patterns than those illustrated in FIGS. 5 and 6 may be used, e.g., as illustrated in FIGS. 7A, 7B. In one example, the transmission may include a spreading factor of one for RS and data symbols. In another example, the ACK or NACK may be transmitted at 914 within a single tone having equal numbers of data symbols and RS symbols during a subframe. The placement of the data symbols with respect to the RS symbols may be arbitrary within the single tone during the subframe. For example, FIG. 7A illustrates the RS symbols being consecutive and the data symbols being consecutive. FIG. 7B illustrates a different example, having the RS symbols interlaced with the data symbols. The data symbols and the RS symbols may be transmitted using such patterns either with or without slot based frequency hopping.

Additionally, the ACK or NACK may be transmitted using limited slot based frequency hopping, as at 906. For example, the transmission may be transmitted without slot based frequency hopping, at 908, e.g., as illustrated in the example of FIG. 5.

As an alternative, the transmission may be transmitted using slot based frequency hopping within a resource block at 910, as illustrated in the example of FIG. 6. Thus, the slot based frequency hopping may be limited to within a resource block.

At 916, the UE may multiplex the ACK channel with a PUSCH. The ACK channel and the PUSCH may frequency hop within a subframe. In a different example, the ACK channel and the PUSCH may be continuous within a subframe. In another example, the ACK channel may hop between edge tones and the PUSCH may occupy the remaining tones between the edge tones, e.g., the middle tones between the ACK channel. Or, the PUSCH may hop between edge tones and the ACK channel may occupy the remaining tones between the edge tones.

At 918, the UE may adjust a timing adjustment timer based on a bundling size of the ACK channel multiplexed with the PUSCH. For example, in NB-IOT, SNR may be too low to receive successfully with single subframe transmission. Thus, information may be transmitted with multiple subframes through either repetition or cross-subframe coding. Such transmission is called bundled transmission and the duration is called bundling size. For LTE, the maximum timer for the timing adjustment is 10 s. For NB-IOT, it may be helpful to increase this value, e.g., to be greater than the bundle size, because the bundle size may be on the order of seconds.

Figure 10:
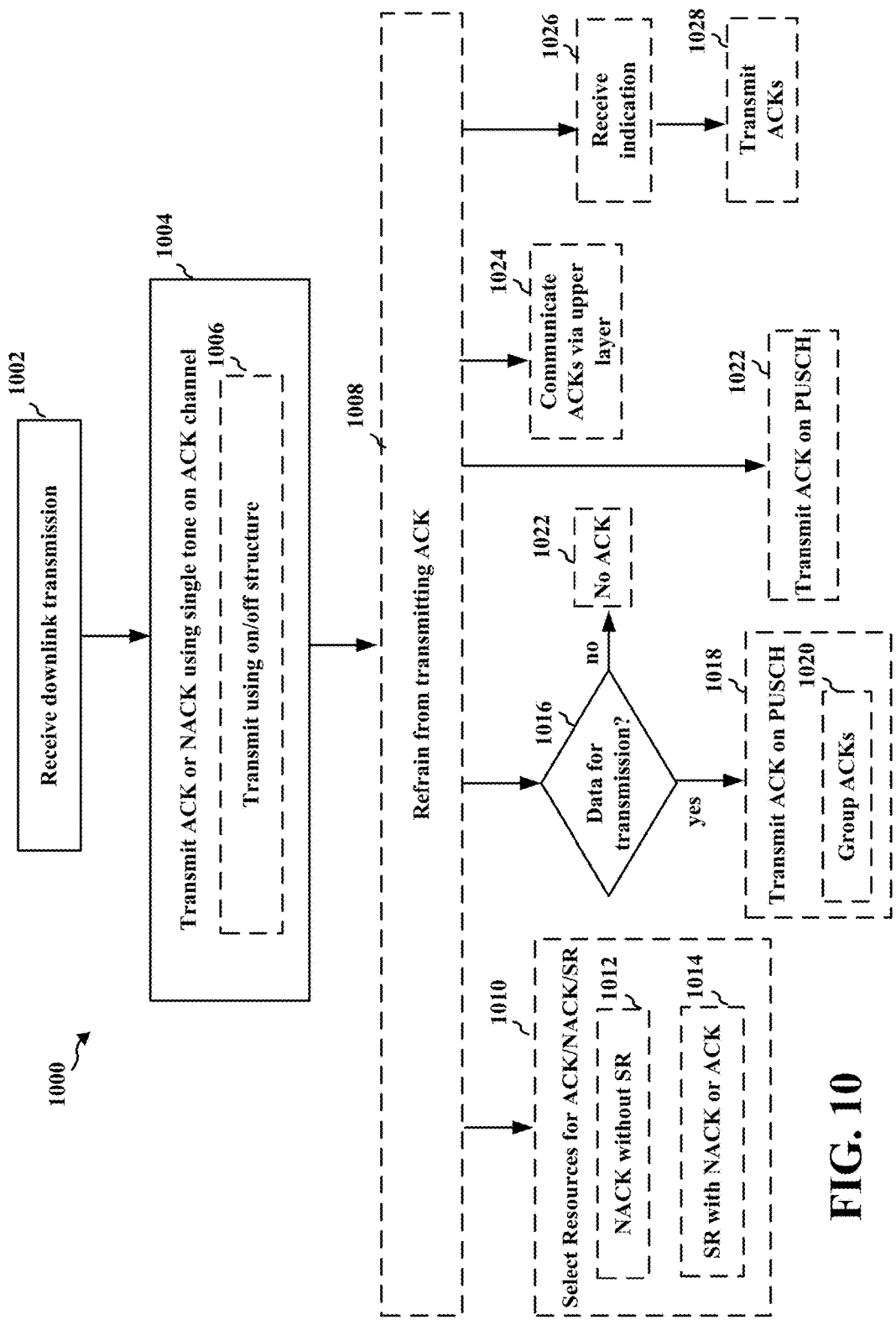
FIG. 10 is a flowchart of a method of wireless communication.

FIG. 10 is a flowchart 1000 of a method of wireless communication. The method may be performed by a UE (e.g., the UE 104, 350, 406, 1450, the apparatus 1102/1102'). Optional aspects in the figures are illustrated using a dashed line. The aspects illustrated in FIG. 10 may also be implemented as a part of transmitting the ACK/NACK at 904 in FIG. 9.

At 1002, the UE receives a downlink transmission, e.g., from an eNB, such as eNB 102, 310, 404, 1150, apparatus 1302/1302'. The wireless communication may comprise narrow band wireless communication.

At 1004, the UE transmits a NACK associated with the downlink transmission, for example, when the downlink transmission is not successfully received. The NACK may be transmitted using an on/off configuration, at 1006. An ACK may be transmitted using a first channel, and a NACK may be transmitted using a second channel.

When the downlink transmission is successfully received, the UE would normally transmit an ACK. At 1008, the UE may refrain from transmitting an ACK associated with the downlink transmission. This may be done in any of a number of ways.

In one example, illustrated at 1010, the UE may select resources for the transmission of the NACK or ACK based on whether an SR will be transmitted simultaneously with the NACK or ACK. For example, at 1012, resources may be selected for transmitted a NACK without an SR. At 1014, different resources may be selected for transmitted an SR with an ACK/NACK.

For example, the group of resources from which the selected resources are selected may comprise a same channel structure and at least one of different tones, different sequences, or different cover codes, wherein resources having at least one of different tones, different sequences, or different cover codes are selected based on whether the SR will be transmitted simultaneously with the NACK or ACK.

As another example, the group of resources from which the selected resources are selected may comprise different channel structures. The resources may be selected depending on whether the transmission will be for the NACK or the SR along with the NACK or the ACK.

Each of the resources may comprise a single tone.

As another example, the group of resources from which the selected resources are selected may comprise a unified channel structure, each of the resources comprising a single tone. When the NACK is to be transmitted without the SR, the NACK may be transmitted using a spreading factor of up to four, e.g., using a spreading factor of 3 or 4. When the SR is to be transmitted with either the ACK or the NACK, a spreading factor of three may be used for the RS and a spreading factor of 4 may be used for the ACK or NACK. FIG. 8B illustrates an example of such resources.

In another example, of refraining from transmitting an ACK, the UE may determine whether the UE has data for transmission on the PUSCH at 1016. When the UE has data for transmission on the PUSCH, the UE may transmit one of an ACK and a second NACK on a PUSCH, at 1018. Multiple ACKS may be grouped together for the transmission at 1020.

When the UE does not have data for transmission on the PUSCH, the UE may refrain from transmitting an ACK, at 1022. Thus, the UE may skip sending the ACK or hold off on sending the ACK when the UE does not have other data for transmission on the PUSCH.

As another example, the UE may transmit the ACK on the PUSCH at 1022 without determining whether it has data for transmission. In this example, the UE may transmit ACKs using only the PUSCH in order to avoid using ACK channel for ACKs. The ACK may comprise a few bits, e.g., one or two bits. The UE may group multiple ACKs together for transmission on the PUSCH.

In another example, the UE may communicate ACKS via upper layer transmissions, without transmitting a physical layer ACK, at 1024.

In another example, the UE may refrain from transmitting ACKs until it receives an indication to transmit ACKS from an eNB at 1026. Then, at 1028, the UE may respond and transmit regarding ACKS to the eNB on the PUSCH at 1028. The indication to transmit ACKs may indicate a period for which the UE shall indicate whether wireless communications were successfully received from the eNB. For example, the UE may indicate that it received the downlink transmission until a certain point.

Figure 11:
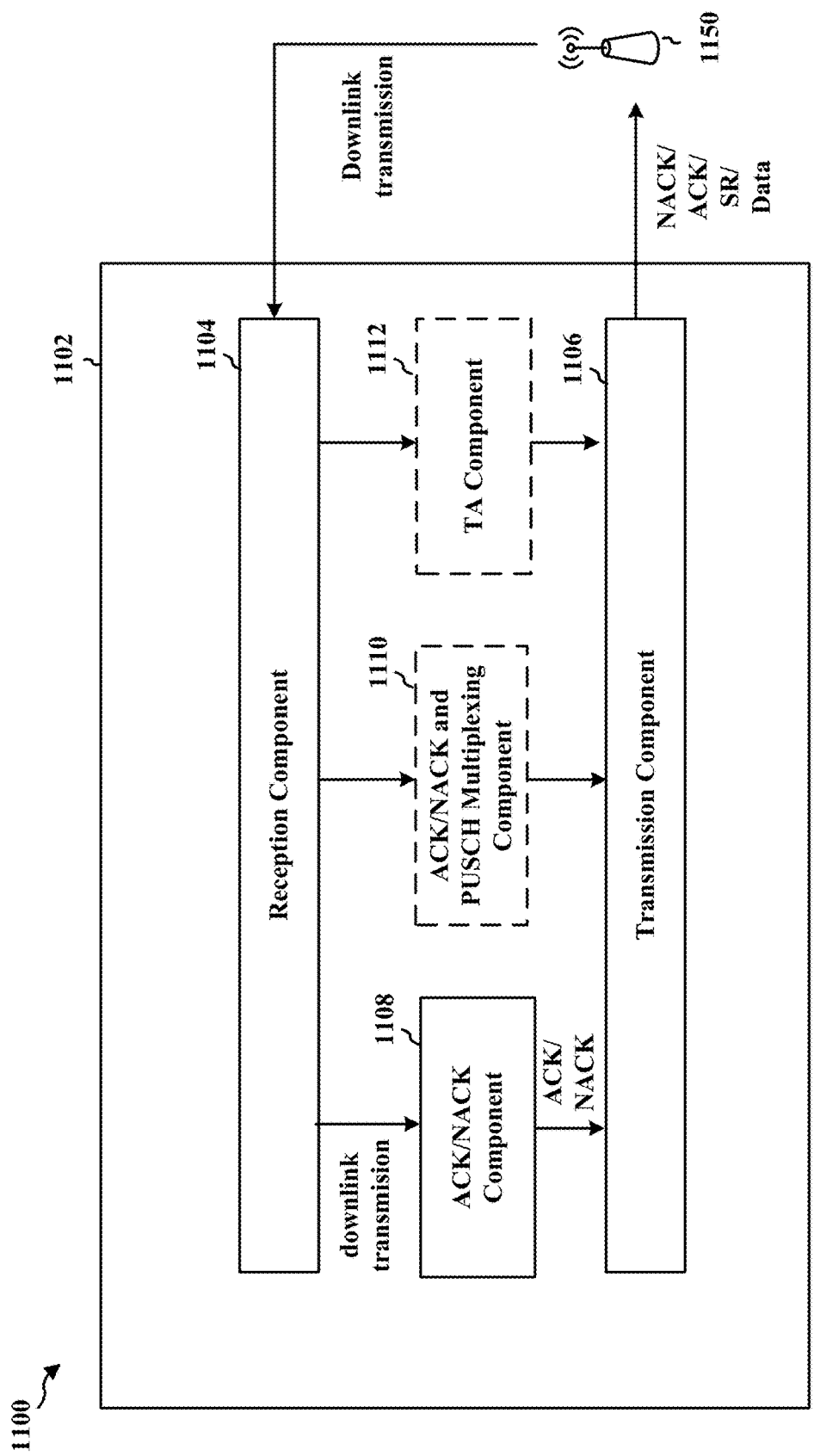
FIG. 11 is a conceptual data flow diagram illustrating the data flow between different means/components in an exemplary apparatus.

FIG. 11 is a conceptual data flow diagram 1100 illustrating the data flow between different means/components in an exemplary apparatus 1102. The apparatus may be a UE. The apparatus includes a reception component 1104 that receives a downlink transmission, e.g., from eNB 1150 and a transmission component 1106 that transmits a NACK/ACK in response to the downlink transmission, as well as SR and data. The apparatus includes an ACK/NACK component 1108 that determines the manner in which the NACK/ACK should be transmitted. For example, the NACK/ACK component 1108 may determine to transmit the NACK or ACK in any of the ways described in detail in connection with FIGS. 9 and 10, e.g., as a single tone on an ACK channel using time spreading. The apparatus may also include a PUSCH multiplexing component 1110 that multiplexes the ACK channel with PUSCH, as described in connection with 916. The apparatus may also include a timing adjustment component 1112 that adjusts a timing adjustment timer based on a bundling size of the ACK channel multiplexed with the PUSCH.

The apparatus may include additional components that perform each of the blocks of the algorithm in the aforementioned flowcharts of FIGS. 9 and 10, as well as described in connection with FIGS. 5-8. As such, each block in the aforementioned flowcharts of FIGS. 9 and 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 12:
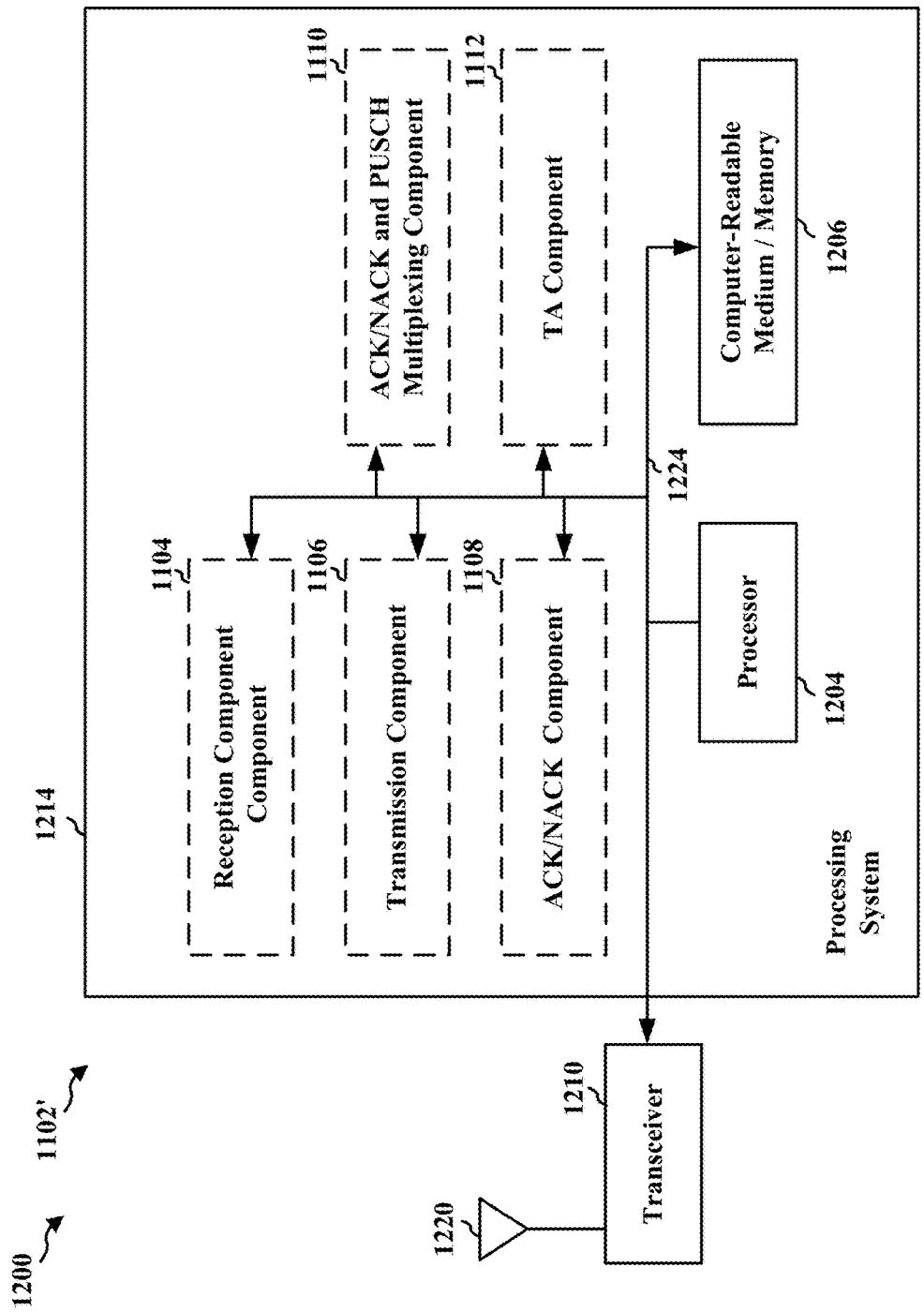
FIG. 12 is a diagram illustrating an example of a hardware implementation for an apparatus employing a processing system.

FIG. 12 is a diagram 1200 illustrating an example of a hardware implementation for an apparatus 1102' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware components, represented by the processor 1204, the components 1104, 1106, 1108, 1110, 1112, and the computer-readable medium/memory 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the reception component 1104. In addition, the transceiver 1210 receives information from the processing system 1214, specifically the transmission component 1106, and based on the received information, generates a signal to be applied to the one or more antennas 1220. The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described supra for any particular apparatus. The computer-readable medium/memory 1206 may also be used for storing data that is manipulated by the processor 1204 when executing software. The processing system 1214 further includes at least one of the components 1104, 1106, 1108, 1110, 1112. The components may be software components running in the processor 1204, resident/stored in the computer readable medium/memory 1206, one or more hardware components coupled to the processor 1204, or some combination thereof. The processing system 1214 may be a component of the UE 350 and may include the memory 360 and/or at least one of the TX processor 368, the RX processor 356, and the controller/processor 359.

In one configuration, the apparatus 1102/1102' for wireless communication includes means for means for receiving a downlink transmission. In another configuration, the apparatus 1102/1102' for wireless communication includes means for transmitting an ACK as a single tone on an ACK channel using time spreading. In one aspect, the transmission may be a single tone transmission transmitted using limited slot based frequency hopping. In another aspect, the wireless communication may comprise narrow band wireless communication. In a further aspect, multiple users may be code division multiplexed with different orthogonal cover codes that cross multiple symbols in a time domain. In still another aspect, the transmission may be transmitted using cover hopping across multiple subframes. Further still, in one aspect, the transmission may be transmitted without slot based frequency hopping. In yet another aspect, the transmission may be transmitted using slot based frequency hopping within a resource block. Still further, the transmission may include three demodulation reference signal (DM-RS) symbols per a seven symbol period. In a further aspect, the transmission may include a spreading factor of three for DM-RS symbols. Further still, the transmission may include a spreading factor of two or four for data symbols. In yet another aspect, an orthogonal cover code may be selected to perform the spreading of the RS and data symbols is a function of a cell specific cyclic shift and a number of spreading factors. In another aspect, the transmission may include a spreading factor of one for RS and data symbols. In an aspect, the ACK or the NACK may be transmitted within a single tone having equal numbers of data symbols and RS symbols during a subframe. Further still, in an aspect, the placement of the data symbols with respect to the RS symbols may be arbitrary within the single tone during the subframe. In another aspect, the data symbols and RS may be transmitted without slot based frequency hopping. In another configuration, the apparatus 1102/1102' for wireless communication includes means for receiving a downlink transmission. In a further configuration, the apparatus 1102/1102' for wireless communication includes means for transmitting a NACK associated with the downlink transmission. In yet another configuration, the apparatus 1102/1102' for wireless communication includes means for refraining from transmitting an ACK associated with the downlink transmission. In an aspect, the NACK may be transmitted using an on/off configuration. In yet another configuration, the apparatus 1102/1102' for wireless communication includes means for selecting resources for the transmission of the NACK or ACK based on whether a SR will be transmitted simultaneously with the NACK or ACK. In a further aspect, a group of resources from which the selected resources are selected may include a same channel structure and at least one of different tones, different sequences, or different cover codes, wherein resources having at least one of different tones, different sequences, or different cover codes are selected based on whether the SR will be transmitted simultaneously with the NACK or ACK. Still further, in an aspect, a group of resources from which the selected resources are selected may include different channel structures, and the resources may be selected depending on whether the transmission will be for the NACK or the SR along with the NACK or the ACK. In a further aspect, each of the resources may include a single tone. In yet another aspect, the group of resources from which the selected resources are selected may include a unified channel structure, each of the resources comprising a single tone. In a further aspect, for the NACK transmitted without the SR, the NACK may be transmitted using a spreading factor of three and four. In another aspect, for the SR transmitted with either the ACK or the NACK, a spreading factor of three may be used for the RS and a spreading factor of 4 may be used for the ACK or NACK. In another configuration, the apparatus 1102/1102' for wireless communication includes means for determining whether the UE has data for transmission on the PUSCH. In a further configuration, the apparatus 1102/1102' for wireless communication includes means for transmitting one of an ACK and a second NACK on a PUSCH when the UE has data for transmission on the PUSCH. In still a further configuration, the apparatus 1102/1102' for wireless communication includes means for determining whether the UE has data for transmission on the PUSCH. In another configuration, the apparatus 1102/1102' for wireless communication includes means for refraining from transmitting an ACK when the UE does not have data for transmission. In still another configuration, the apparatus 1102/1102' for wireless communication includes means for transmitting the ACK on the PUSCH. In one aspect, the apparatus 1102/1102' for wireless communication includes means for grouping multiple ACKS together for transmission on the PUSCH when the ACK comprises at most two bits. Still further, in one configuration, the apparatus 1102/1102' for wireless communication includes means for communicating ACKs via upper layer transmissions, without transmitting a physical layer ACK. In a further configuration, the apparatus 1102/1102' for wireless communication includes means for receiving an indication to transmit ACKS from an eNB. In yet another configuration, the apparatus 1102/1102' for wireless communication includes means for transmitting regarding ACKs to the eNB on the PUSCH. In an aspect, the indication to transmit ACKs indicates a period for which the UE shall indicate whether wireless communications were successfully received from the eNB. In another configuration, the apparatus 1102/1102' for wireless communication includes means for multiplexing the ACK channel with a PUSCH. In an aspect, the ACK channel and the PUSCH may hop in frequency within a subframe. In another aspect, the ACK channel and the PUSCH may be continuous in frequency within a subframe. In another aspect, the ACK channel may hop between edge tones and the PUSCH may occupy the remaining tones between the edge tones, or vice versa. In another configuration, the apparatus 1102/1102' for wireless communication includes means for adjusting a timing adjustment timer based on a bundling size of the ACK channel multiplexed with the PUSCH. The aforementioned means may be one or more of the aforementioned components of the apparatus 1102 and/or the processing system 1214 of the apparatus 1102' configured to perform the functions recited by the aforementioned means. As described supra, the processing system 1214 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 13:
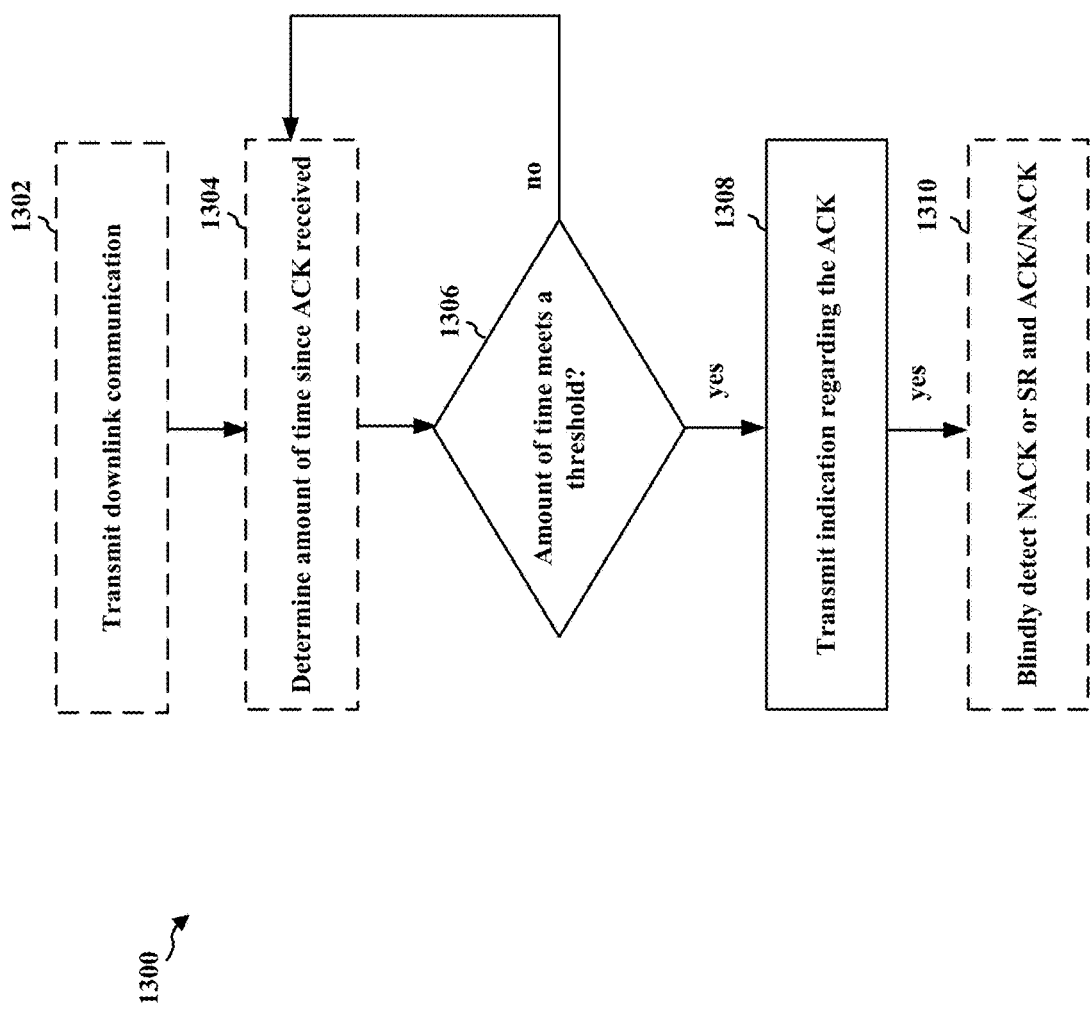
FIG. 13 is a flowchart of a method of wireless communication.

FIG. 13 is a flowchart 1300 of a method of wireless communication. The method may be performed by an eNB (e.g., the eNB 104, 310, 404, 1150, the apparatus 1402/1402'). At 1302, the eNB may transmit downlink communication to a UE. The UE may be, e.g., UE 106, 350, 406, 1450, or apparatus 1102, 1102'. At 1304, the eNB may determine an amount of time since an ACK was received from a UE, e.g., a UE to which the eNB has transmitted a downlink transmission. For example, as described in connection with FIGS. 9 and 10, at times a UE may refrain from sending an ACK, even when it has successfully received a DL transmission. Therefore, this determination at 1304 and 1306 enable an eNB to monitor the amount of time between ACKs from a UE in order to avoid continuing to transmit to a UE that is not receiving DL communication.

At 1306, the eNB determines whether an ACK has been received from the UE within a threshold amount of time. When an ACK has not been received from the UE for at least the threshold amount of time, the eNB transmits an indication to the UE to transmit regarding the ACK at 1308. This indication may trigger the UE to respond by transmitting regarding the ACK on PUSCH so that the eNB may determine when the UE last successfully received a downlink transmission from the eNB. At times, a UE may refrain from transmitting an ACK even when it has successfully received the downlink transmission. Therefore, the indication enables the eNB to check whether the UE has successfully received the downlink transmission or whether the UE has not received the downlink transmission.

At 1310, the eNB may perform blind detection of at least one of a NACK and an SR transmitted simultaneously with the NACK or ACK.

Figure 14:
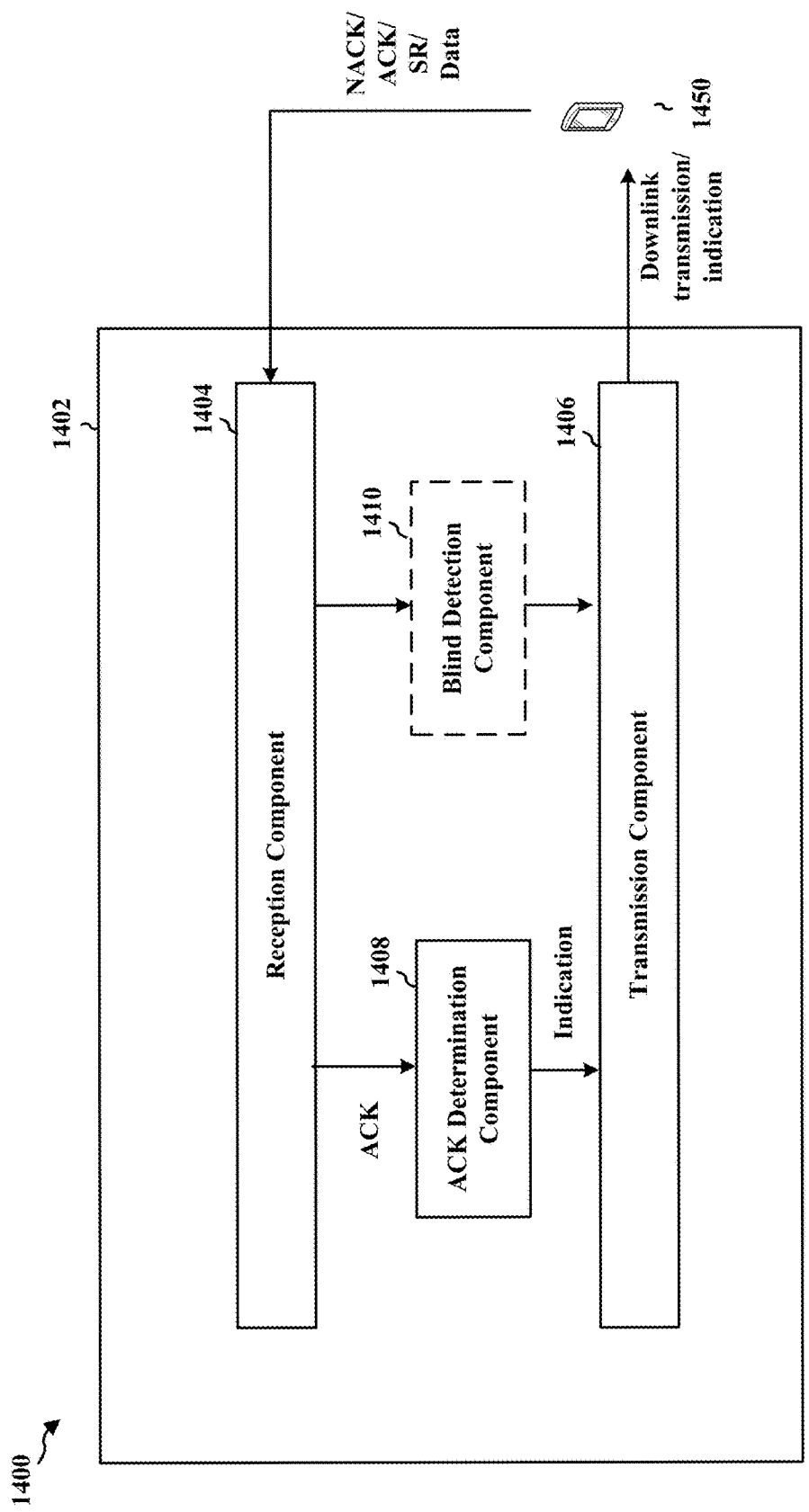
FIG. 14 is a conceptual data flow diagram illustrating the data flow between different means/components in an exemplary apparatus.

FIG. 14 is a conceptual data flow diagram 1400 illustrating the data flow between different means/components in an exemplary apparatus 1402. The apparatus may be an eNB. The apparatus includes a transmission component 1406 that transmits downlink communication to a UE 1450 and a reception component 1404 that receives ACKs/NACKs from the UE 1450 in response to the downlink communication. The apparatus 1400 also includes an ACK determination component that determines whether an ACK has been received from UE 1450 within a threshold amount of time and when an ACK has not been received from the UE for at least the threshold amount of time, has an indication transmitted to the UE to transmit regarding the ACK. The apparatus may also include a blind detection component 1410 that performs blind detection of at least one of a NACK and a SR transmitted simultaneously with the NACK or ACK.

The apparatus may include additional components that perform each of the blocks of the algorithm in the aforementioned flowcharts of FIG. 13. As such, each block in the aforementioned flowcharts of FIG. 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 15:
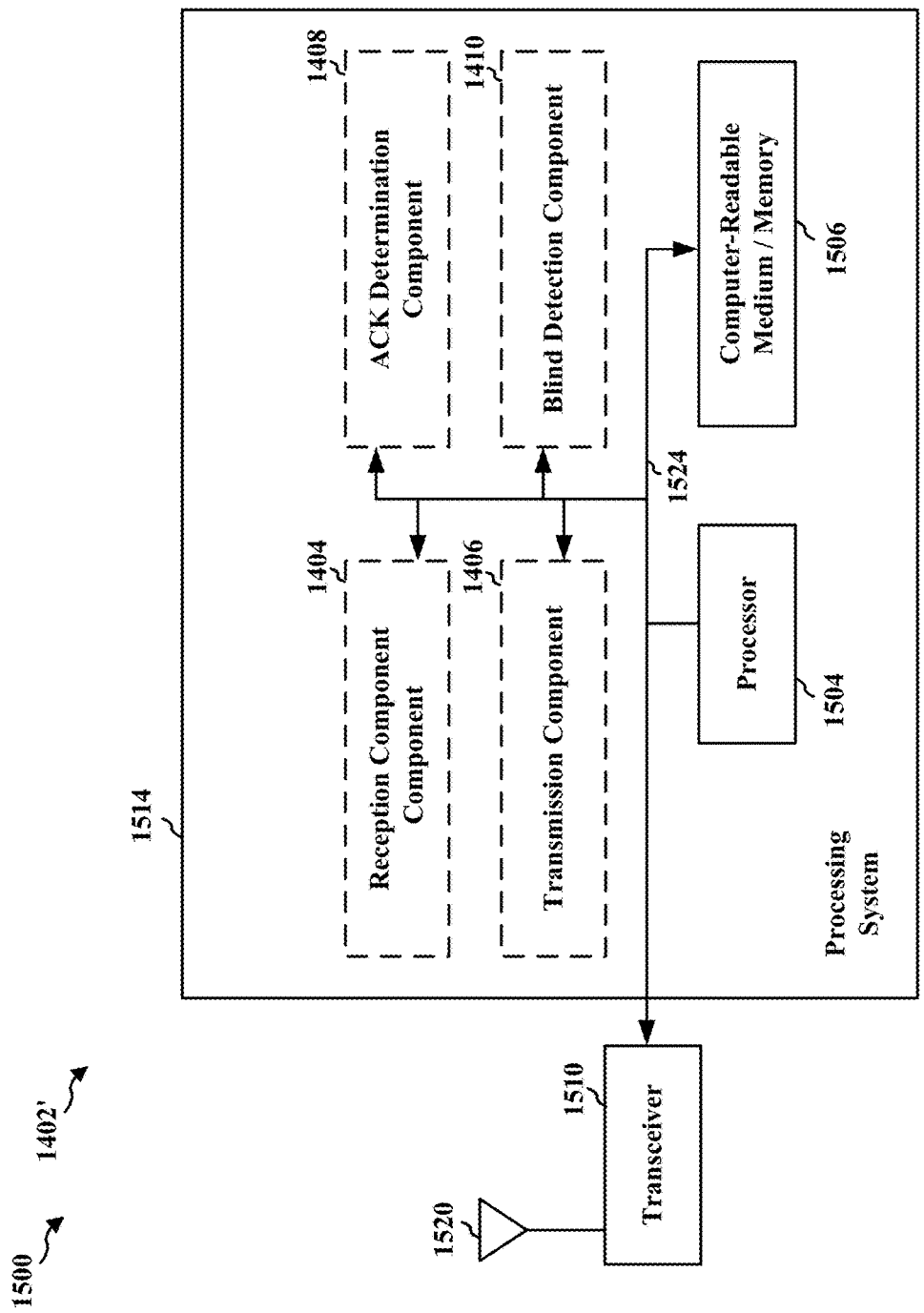
FIG. 15 is a diagram illustrating an example of a hardware implementation for an apparatus employing a processing system.

FIG. 15 is a diagram 1500 illustrating an example of a hardware implementation for an apparatus 1402' employing a processing system 1514. The processing system 1514 may be implemented with a bus architecture, represented generally by the bus 1524. The bus 1524 may include any number of interconnecting buses and bridges depending on the specific application of the processing system 1514 and the overall design constraints. The bus 1524 links together various circuits including one or more processors and/or hardware components, represented by the processor 1504, the components 1404, 1406, 1408, 1410, and the computer-readable medium/memory 1506. The bus 1524 may also link various other circuits such as timing sources, peripherals, voltage regulators, and power management circuits, which are well known in the art, and therefore, will not be described any further.

The processing system 1514 may be coupled to a transceiver 1510. The transceiver 1510 is coupled to one or more antennas 1520. The transceiver 1510 provides a means for communicating with various other apparatus over a transmission medium. The transceiver 1510 receives a signal from the one or more antennas 1520, extracts information from the received signal, and provides the extracted information to the processing system 1514, specifically the reception component 1404. In addition, the transceiver 1510 receives information from the processing system 1514, specifically the transmission component 1406, and based on the received information, generates a signal to be applied to the one or more antennas 1520. The processing system 1514 includes a processor 1504 coupled to a computer-readable medium/memory 1506. The processor 1504 is responsible for general processing, including the execution of software stored on the computer-readable medium/memory 1506. The software, when executed by the processor 1504, causes the processing system 1514 to perform the various functions described supra for any particular apparatus. The computer-readable medium/memory 1506 may also be used for storing data that is manipulated by the processor 1504 when executing software. The processing system 1514 further includes at least one of the components 1404, 1406, 1408, 1410. The components may be software components running in the processor 1504, resident/stored in the computer readable medium/memory 1506, one or more hardware components coupled to the processor 1504, or some combination thereof. The processing system 1514 may be a component of the eNB 310 and may include the memory 376 and/or at least one of the TX processor 316, the RX processor 370, and the controller/processor 375.

In one configuration, the apparatus 1402/1402' for wireless communication includes means for determining whether a ACK has been received from a UE within a threshold amount of time. In another configuration, the apparatus 1402/1402' for wireless communication includes means for transmitting an indication to the UE to transmit regarding the ACK when an ACK has not been received from the UE for at least the threshold amount of time. In a further configuration, the apparatus 1402/1402' for wireless communication includes means for performing blind detection of at least one of a NACK and a SR transmitted simultaneously with the NACK or ACK. The aforementioned means may be one or more of the aforementioned components of the apparatus 1402 and/or the processing system 1514 of the apparatus 1402' configured to perform the functions recited by the aforementioned means. As described supra, the processing system 1514 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment, comprising:
   receiving a downlink transmission; and
   transmitting an uplink transmission comprising a single tone acknowledgement (ACK) and a demodulation reference signal (DM-RS), wherein the uplink transmission comprises a single tone of bandwidth on an ACK channel using time-spreading, wherein the transmission includes three DM-RS symbols per a seven symbol period based on an orthogonal cover code and a spreading factor of three for the DM-RS symbols.

2. The method of claim 1, wherein the wireless communication comprises narrow band wireless communication.

3. The method of claim 1, wherein multiple users are code division multiplexed with different orthogonal cover codes that cross multiple symbols in a time domain.

4. The method of claim 1, wherein the transmission includes a spreading factor of two or four for data symbols.

5. The method of claim 1, wherein the orthogonal cover code performs the spreading of the DM-RS symbols, and wherein the orthogonal cover code is a function of a cell specific parameter and the spreading factor of three.

6. The method of claim 1, wherein the transmission includes a spreading factor of one for data symbols.

7. The method of claim 1, wherein the transmission is transmitted using cover code hopping across multiple subframes.

8. The method of claim 1, wherein the transmission is transmitted without slot based frequency hopping.

9. The method of claim 1, wherein the transmission is transmitted using slot based frequency hopping.

10. The method of claim 1, wherein the ACK is transmitted within the single tone having equal numbers of data symbols and reference signal (RS) symbols during a subframe.

11. The method of claim 10, wherein the placement of the data symbols with respect to the RS symbols is arbitrary within the single tone during the subframe, and
    wherein the data symbols and RS are transmitted without slot based frequency hopping.

12. The method of claim 1, further comprising:
    multiplexing the ACK channel with a physical uplink shared channel (PUSCH).

13. The method of claim 12, wherein the ACK channel and the PUSCH hop in frequency within a subframe.

14. The method of claim 12, wherein the ACK channel and the PUSCH are continuous in frequency within a subframe.

15. The method of claim 12, wherein the ACK channel hops between edge tones and the PUSCH occupies the remaining tones between the edge tones, or the PUSCH hops between edge tones and the ACK channel occupies the remaining tones between the edge tones.

16. The method of claim 12, further comprising:
    adjusting a timing adjustment timer based on a bundling size of the ACK channel.

17. The method of claim 1, further comprising:
    transmitting a negative acknowledgement (NACK) associated with the downlink transmission.

18. The method of claim 17, wherein the NACK is transmitted using a second channel.

19. The method of claim 17, wherein the NACK is transmitted using an on/off configuration.

20. The method of claim 17, further comprising:
    selecting resources for the transmission of the NACK or ACK based on whether a scheduling request (SR) will be transmitted simultaneously with the NACK or the ACK.

21. The method of claim 20, wherein a group of resources from which the selected resources are selected comprises a same channel structure and at least one of different tones, different sequences, or different cover codes, wherein resources having at least one of different tones, different sequences, or different cover codes are selected based on whether the scheduling request (SR) will be transmitted simultaneously with the NACK or the ACK.

22. The method of claim 20, wherein a group of resources from which the selected resources are selected comprises different channel structures, and wherein the resources are selected depending on whether the transmission will be for the NACK or the SR along with the NACK or the ACK.

23. The method of claim 22, wherein each of the resources comprising a single tone.

24. The method of claim 20, wherein the group of resources from which the selected resources are selected comprise a unified channel structure, each of the resources comprising a single tone,
    wherein for the NACK transmitted without the SR, the NACK is transmitted using a spreading factor of three and four,
    wherein for the SR transmitted with either the ACK or the NACK, the spreading factor of three is used for the RS and a spreading factor of 4 is used for the ACK or NACK.

25. The method of claim 1, wherein the method is performed by a user equipment (UE), the method further comprising:
    determining whether the UE has data for transmission on the PUSCH; and
    transmitting one of the ACK and a second NACK on a Physical Uplink Shared Channel (PUSCH) when the UE has data for transmission on the PUSCH.

26. The method of claim 1, wherein the method is performed by a user equipment (UE), the method further comprising:
    determining whether the UE has data for transmission on the PUSCH; and
    refraining from transmitting the ACK when the UE does not have data for transmission.

27. The method of claim 1, further comprising:
    transmitting the ACK on the Physical Uplink Shared Control Channel (PUSCH).

28. The method of claim 27, wherein the ACK comprises at most two bits, the method further comprising:
    grouping multiple ACKs together for transmission on the PUSCH.

29. The method of claim 1, further comprising:
    communicating ACKs via upper layer transmissions, without transmitting a physical layer ACK.

30. The method of claim 1, further comprising:
    refraining from transmitting at least one ACK associated with the downlink transmission until an indication to transmit an ACK is received.

31. The method of claim 30, further comprising:
    receiving an indication to transmit ACKs from an evolved node B (eNB); and
    transmitting regarding ACKs to the eNB on the PUSCH.

32. The method of claim 31, wherein the indication to transmit ACKs indicates a period for which the UE shall indicate whether wireless communications were successfully received from the eNB.

33. An apparatus for wireless communication, comprising:
means for receiving a downlink transmission; and
means for transmitting an uplink transmission comprising a single tone acknowledgement (ACK) and a demodulation reference signal (DM-RS), wherein the uplink transmission comprises a single tone of bandwidth on an ACK channel using time-spreading, wherein the transmission includes three DM-RS symbols per a seven symbol period based on an orthogonal cover code and a spreading factor of three for the DM-RS symbols.

34. The apparatus of claim 33, wherein multiple users are code division multiplexed with different orthogonal cover codes that cross multiple symbols in a time domain.

35. The apparatus of claim 33, wherein the transmission is transmitted using cover code hopping across multiple subframes.

36. The apparatus of claim 33, wherein the transmission is transmitted without slot based frequency hopping.

37. The apparatus of claim 33, further comprising:
means for multiplexing the ACK channel with a physical uplink shared channel (PUSCH).

38. The apparatus of claim 37, further comprising:
means for adjusting a timing adjustment timer based on a bundling size of the ACK channel multiplexed with the PUSCH.

39. The apparatus of claim 33, wherein the means for transmitting transmit a negative acknowledgement (NACK) associated with the downlink transmission.

40. The apparatus of claim 39, wherein the means for transmitting selects resources for the transmission of the NACK or ACK based on whether a scheduling request (SR) will be transmitted simultaneously with the NACK or the ACK, wherein each of the resources comprise a single tone, wherein a group of resources from which the selected resources are selected comprises:
a same channel structure and at least one of different tones, different sequences, or different cover codes, wherein resources having at least one of different tones, different sequences, or different cover codes are selected based on whether the scheduling request (SR) will be transmitted simultaneously with the NACK or the ACK, or
different channel structures, and wherein the resources are selected depending on whether the transmission will be for the NACK or the SR along with the NACK or the ACK.

41. The apparatus of claim 39, wherein the means for transmitting selects resources for the transmission of the NACK or ACK based on whether a scheduling request (SR) will be transmitted simultaneously with the NACK or the ACK, wherein the group of resources from which the selected resources are selected comprise a unified channel structure, each of the resources comprising a single tone,
wherein for the NACK transmitted without the SR, the NACK is transmitted using a spreading factor of three and four,
wherein for the SR transmitted with either the ACK or the NACK, a spreading factor of three is used for the RS and a spreading factor of 4 is used for the ACK or NACK.

42. The apparatus of claim 33, wherein the means for transmitting determines whether the UE has data for transmission on the PUSCH, transmits one of the ACK and a second NACK on a Physical Uplink Shared Channel (PUSCH) when the apparatus has data for transmission on the PUSCH and refrains from transmitting the ACK when the apparatus does not have data for transmission.

43. The apparatus of claim 33, wherein the means for transmitting transmits the ACK on the Physical Uplink Shared Control Channel (PUSCH).

44. The apparatus of claim 43, wherein the ACK comprises at most two bits, wherein the means for transmitting groups multiple ACKs together for transmission on the PUSCH.

45. The apparatus of claim 33, wherein the means for transmitting refrains from transmitting at least one ACK associated with the downlink transmission until an indication to transmit an ACK is received.

46. The apparatus of claim 45, further comprising:
means for receiving an indication to transmit ACKs from an evolved node B (eNB), wherein the means for transmitting transmits regarding ACKs to the eNB on the PUSCH in response to receiving the indication.

47. The apparatus of claim 28, wherein the orthogonal cover code spreads the DM-RS symbols, and wherein the orthogonal cover code is a function of a cell specific parameter and the spreading factor of three.

48. An apparatus for wireless communication, comprising:
a memory; and
at least one processor coupled to the memory and configured to:
receive a downlink transmission; and
transmit an uplink transmission comprising a single tone acknowledgement (ACK) and a demodulation reference signal (DM-RS), wherein the uplink transmission comprises a single tone of bandwidth on an ACK channel using time-spreading, wherein the transmission includes three DM-RS symbols per a seven symbol period based on an orthogonal cover code and a spreading factor of three for the DM-RS symbols.

49. The apparatus of claim 48, wherein multiple users are code division multiplexed with different orthogonal cover codes that cross multiple symbols in a time domain.

50. The apparatus of claim 48, wherein the transmission is transmitted using cover code hopping across multiple subframes.

51. The apparatus of claim 48, wherein the transmission is transmitted without slot based frequency hopping.

52. The apparatus of claim 48, wherein the at least one processor is further configured to:
multiplex the ACK channel with a physical uplink shared channel (PUSCH).

53. The apparatus of claim 52, wherein the at least one processor is further configured to:
adjust a timing adjustment timer based on a bundling size of the ACK channel multiplexed with the PUSCH.

54. The apparatus of claim 48, wherein the at least one processor is further configured to:
transmit a negative acknowledgement (NACK) associated with the downlink transmission.

55. The apparatus of claim 54, wherein the at least one processor is further configured to:
select resources for the transmission of the NACK or ACK based on whether a scheduling request (SR) will be transmitted simultaneously with the NACK or the ACK, wherein each of the resources comprise a single tone, wherein a group of resources from which the selected resources are selected comprises:

a same channel structure and at least one of different tones, different sequences, or different cover codes, wherein resources having at least one of different tones, different sequences, or different cover codes are selected based on whether the scheduling request (SR) will be transmitted simultaneously with the NACK or the ACK, or different channel structures, and wherein the resources are selected depending on whether the transmission will be for the NACK or the SR along with the NACK or the ACK.

56. The apparatus of claim 54, wherein the at least one processor is further configured to:

select resources for the transmission of the NACK or the ACK based on whether a scheduling request (SR) will be transmitted simultaneously with the NACK or the ACK, wherein the group of resources from which the selected resources are selected comprise a unified channel structure, each of the resources comprising a single tone, wherein for the NACK transmitted without the SR, the NACK is transmitted using a spreading factor of three and four, wherein for the SR transmitted with either the ACK or the NACK, a spreading factor of three is used for the RS and a spreading factor of 4 is used for the ACK or NACK.

57. The apparatus of claim 48, wherein the at least one processor is further configured to:

determine whether the UE has data for transmission on the PUSCH;

transmit one of the ACK and a second NACK on a Physical Uplink Shared Channel (PUSCH) when the apparatus has data for transmission on the PUSCH; and refrain from transmitting the ACK when the apparatus does not have data for transmission.

58. The apparatus of claim 48, wherein the at least one processor is further configured to:

transmit the ACK on the Physical Uplink Shared Control Channel (PUSCH).

59. The apparatus of claim 58, wherein the ACK comprises at most two bits, wherein the at least one processor is further configured to:

group multiple ACKs together for transmission on the PUSCH.

60. The apparatus of claim 48, wherein the at least one processor is further configured to:

refrain from transmitting at least one ACK associated with the downlink transmission until an indication to transmit an ACK is received.

61. The apparatus of claim 60, wherein the at least one processor is further configured to:

receive an indication to transmit ACKs from an evolved node B (eNB); and transmit regarding ACKs to the eNB on the PUSCH in response to receiving the indication.

62. The apparatus of claim 48, wherein the orthogonal cover code spreads the DM-RS symbols, and wherein the orthogonal cover code is a function of a cell specific parameter and the spreading factor of three.

63. A computer-readable medium storing computer executable code, comprising code to:

receive a downlink transmission; and transmit an uplink transmission comprising a single tone acknowledgement (ACK) and a demodulation reference signal (DM-RS), wherein the uplink transmission comprises a single tone of bandwidth on an ACK channel using time-spreading, wherein the transmission includes three DM-RS symbols per a seven symbol period based on an orthogonal cover code and a spreading factor of three for the DM-RS symbols.

64. The computer-readable medium of claim 63, wherein multiple users are code division multiplexed with different orthogonal cover codes that cross multiple symbols in a time domain.

65. The computer-readable medium of claim 63, wherein the transmission is transmitted using cover code hopping across multiple subframes.

66. The computer-readable medium of claim 63, wherein the transmission is transmitted without slot based frequency hopping.

67. The computer-readable medium of claim 63, wherein the ACK is transmitted on the Physical Uplink Shared Control Channel (PUSCH).

68. The computer-readable medium of claim 63, further comprising code to: multiplex the ACK channel with a physical uplink shared channel (PUSCH).

69. The computer-readable medium of claim 63, wherein the orthogonal cover code spreads the DM-RS symbols, and wherein the orthogonal cover code is a function of a cell specific parameter and the spreading factor of three.

* * * * *